US012664818B2

(12) United States Patent　　(10) Patent No.:　US 12,664,818 B2
Afshar et al.　　　　　　　　　　(45) Date of Patent:　Jun. 23, 2026

(54) SYSTEMS AND METHODS FOR ON-DEVICE PERSON RECOGNITION AND PROVISION OF INTELLIGENT ALERTS

(71) Applicant: Google LLC, Mountain View, CA (US)

(72) Inventors: Mohammad Afshar, Mountain View, CA (US); Saajan Shridhar, Mountain View, CA (US); George Alban Heitz, III, Mountain View, CA (US); Andrew C. Gallagher, Mountain View, CA (US); Michael C. Nechyba, Pittsburgh, PA (US); Joseph E. Roth, Longmont, CO (US)

(73) Assignee: Google LLC, Mountain View, CA (US)

( * ) Notice: Subject to any disclaimer, the term of this patent is extended or adjusted under 35 U.S.C. 154(b) by 331 days.

(21) Appl. No.: 18/040,241

(22) PCT Filed: Aug. 1, 2022

(86) PCT No.: PCT/US2022/074367
§ 371 (c)(1),
(2) Date: Feb. 1, 2023

(87) PCT Pub. No.: WO2023/015152
PCT Pub. Date: Feb. 9, 2023

(65) Prior Publication Data
US 2024/0265731 A1　　Aug. 8, 2024

Related U.S. Application Data

(60) Provisional application No. 63/228,556, filed on Aug. 2, 2021.

(51) Int. Cl.
*G06V 40/16*　　　(2022.01)
*G06V 10/762*　　(2022.01)
*G06V 10/94*　　　(2022.01)

(52) U.S. Cl.
CPC .......... *G06V 40/172* (2022.01); *G06V 10/762* (2022.01); *G06V 10/95* (2022.01)

(58) Field of Classification Search
CPC ...... G06V 10/762; G06V 10/95; G06V 20/52; G06V 40/172
See application file for complete search history.

(56) References Cited

U.S. PATENT DOCUMENTS

| | | | |
|---|---|---|---|
| 4,737,847 A | 4/1988 | Araki et al. | |
| 4,967,046 A | 10/1990 | Priesemuth | |

(Continued)

FOREIGN PATENT DOCUMENTS

| | | | |
|---|---|---|---|
| CN | 110770717 A | 2/2020 | |
| EP | 1024666 | 8/2000 | |

(Continued)

OTHER PUBLICATIONS

Schroff et al, "FaceNet: A Unified Embedding for Face Recognition and Clustering" (Year: 2015).*

(Continued)

*Primary Examiner* — Ruiping Li
(74) *Attorney, Agent, or Firm* — Colby Nipper PLLC

(57) ABSTRACT

The present document describes systems and methods for on-device person recognition and provision of intelligent alerts. The system includes a decentralized multi-camera system for on-device facial recognition. A device (e.g., security camera, video doorbell) captures images/video of a person, processes input image frames, detects face images, filters static faces, and aligns a rotation of the face to be upright and frontal. The device then filters low-quality face images and/or images having a large portion of the face occluded. The device computes a face embedding, compares it against a set of locally stored reference embeddings, and sends matching results to cloud services, which, based on (Continued)

the matching result, notifies the device owner whether the observed person is a known person or a stranger. Face detection and recognition computations are performed on device, not at the cloud. No sensitive information is transmitted off device and privacy is thus preserved.

20 Claims, 15 Drawing Sheets

(56) References Cited

U.S. PATENT DOCUMENTS

| | | |
|---|---|---|
| 5,237,408 A | 8/1993 | Blum et al. |
| D339,543 S | 9/1993 | Martin |
| 5,396,284 A | 3/1995 | Freeman |
| 5,627,586 A | 5/1997 | Yamasaki |
| 5,854,902 A | 12/1998 | Wilson et al. |
| 5,956,424 A | 9/1999 | Wootton et al. |
| 5,969,755 A | 10/1999 | Courtney |
| 6,028,626 A | 2/2000 | Aviv |
| 6,046,745 A | 4/2000 | Moriya et al. |
| 6,107,918 A | 8/2000 | Klein et al. |
| 6,144,375 A | 11/2000 | Jain et al. |
| 6,236,395 B1 | 5/2001 | Sezan et al. |
| D450,059 S | 11/2001 | Itou |
| 6,366,296 B1 | 4/2002 | Boreczky et al. |
| 6,400,378 B1 | 6/2002 | Snook |
| 6,424,370 B1 | 7/2002 | Courtney |
| 6,476,858 B1 | 11/2002 | Ramirez Diaz et al. |
| 6,496,598 B1 | 12/2002 | Harman |
| 6,535,793 B2 | 3/2003 | Allard |
| 6,571,050 B1 | 5/2003 | Park |
| 6,600,784 B1 | 7/2003 | Divakaran et al. |
| 6,611,653 B1 | 8/2003 | Kim et al. |
| 6,628,835 B1 | 9/2003 | Brill et al. |
| 6,643,416 B1 | 11/2003 | Daniels et al. |
| 6,647,200 B1 | 11/2003 | Tanaka |
| D483,281 S | 12/2003 | Cobigo |
| 6,665,423 B1 | 12/2003 | Mehrotra et al. |
| 6,697,103 B1 | 2/2004 | Fernandez et al. |
| 6,741,977 B1 | 5/2004 | Nagaya et al. |
| D491,956 S | 6/2004 | Ombao et al. |
| 6,792,676 B2 | 9/2004 | Haji et al. |
| 6,816,184 B1 | 11/2004 | Brill et al. |
| D499,740 S | 12/2004 | Ombao et al. |
| D510,584 S | 10/2005 | Tierney |
| 6,970,183 B1 | 11/2005 | Monroe |
| 7,016,415 B2 | 3/2006 | Alvarez |
| 7,023,469 B1 | 4/2006 | Olson |
| 7,142,600 B1 | 11/2006 | Schonfeld et al. |
| D555,661 S | 11/2007 | Kim |
| 7,403,116 B2 | 7/2008 | Bittner |
| 7,421,455 B2 | 9/2008 | Hua et al. |
| 7,421,727 B2 | 9/2008 | Oya et al. |
| 7,433,493 B1 | 10/2008 | Miyashi et al. |
| 7,440,613 B2 | 10/2008 | Xu |
| 7,447,337 B2 | 11/2008 | Zhang et al. |
| D584,749 S | 1/2009 | Smith et al. |
| D590,412 S | 4/2009 | Saft et al. |
| D607,001 S | 12/2009 | Ording |
| 7,629,995 B2 | 12/2009 | Salivar et al. |
| 7,685,519 B1 | 3/2010 | Duncan et al. |
| 7,760,908 B2 | 7/2010 | Curtner et al. |
| 7,765,482 B2 | 7/2010 | Wood et al. |
| D621,413 S | 8/2010 | Rasmiussen |
| D625,323 S | 10/2010 | Matsushima et al. |
| 7,813,525 B2 | 10/2010 | Aggarwal |
| 7,823,066 B1 | 10/2010 | Kuramura |
| 7,920,626 B2 | 4/2011 | Fernandez et al. |
| 7,924,323 B2 | 4/2011 | Walker et al. |
| D638,025 S | 5/2011 | Saft et al. |
| 7,995,096 B1 | 8/2011 | Cressy et al. |
| 8,115,623 B1 | 2/2012 | Green |
| 8,122,038 B2 | 2/2012 | Handy et al. |
| 8,130,839 B2 | 3/2012 | Kawashima et al. |
| 8,200,669 B1 | 6/2012 | Iampietro et al. |
| 8,204,273 B2 | 6/2012 | Chambers et al. |
| 8,284,258 B1 | 10/2012 | Cetin et al. |
| 8,295,597 B1 | 10/2012 | Sharma et al. |
| 8,300,890 B1 | 10/2012 | Gaikwad et al. |
| 8,305,447 B1 | 11/2012 | Wong |
| 8,390,684 B2 | 3/2013 | Piran et al. |
| 8,401,232 B2 | 3/2013 | Fan |
| 8,494,234 B1 | 7/2013 | Bozinovic et al. |
| 8,515,128 B1 | 8/2013 | Hildreth |
| 8,525,665 B1 | 9/2013 | Trundle et al. |
| 8,537,219 B2 | 9/2013 | Desimone et al. |
| D690,757 S | 10/2013 | Bart et al. |
| 8,577,091 B2 | 11/2013 | Ivanov et al. |
| 8,587,653 B1 | 11/2013 | Vidunas et al. |
| 8,613,070 B1 | 12/2013 | Borzycki et al. |
| 8,676,493 B2 | 3/2014 | M et al. |
| 8,688,483 B2 | 4/2014 | Watts et al. |
| 8,707,194 B1 | 4/2014 | Jenkins et al. |
| 8,775,242 B2 | 7/2014 | Tavares et al. |
| 8,780,201 B1 | 7/2014 | Scalisi et al. |
| 8,854,457 B2 | 10/2014 | De Vleeschouwer et al. |
| 8,861,804 B1 | 10/2014 | Johnson |
| 8,872,915 B1 | 10/2014 | Scalisi et al. |
| 8,902,085 B1 | 12/2014 | Ray et al. |
| 8,941,733 B2 | 1/2015 | Albers et al. |
| 8,941,736 B1 | 1/2015 | Scalisi |
| 8,942,438 B2 | 1/2015 | Ivanov et al. |
| 8,953,848 B2 | 2/2015 | Ivanov et al. |
| 8,958,602 B1 | 2/2015 | Lane et al. |
| 8,966,368 B2 | 2/2015 | Kuramura |
| 8,982,141 B2 | 3/2015 | Freyhult |
| 9,014,429 B2 | 4/2015 | Badawy |
| 9,025,836 B2 | 5/2015 | Ptucha |
| 9,064,393 B2 | 6/2015 | He |
| 9,082,018 B1 | 7/2015 | Laska et al. |
| 9,124,858 B2 | 9/2015 | Jang et al. |
| 9,158,974 B1 | 10/2015 | Laska et al. |
| 9,172,911 B2 | 10/2015 | Kristiansen et al. |
| 9,213,903 B1 | 12/2015 | Laska et al. |
| 9,269,243 B2 | 2/2016 | Shet et al. |
| 9,325,905 B2 | 4/2016 | Noyes |
| 9,361,011 B1 | 6/2016 | Burns |
| 9,373,076 B1 | 6/2016 | Appelman et al. |
| D764,958 S | 8/2016 | Scalisi |
| 9,420,331 B2 | 8/2016 | Laska et al. |
| 9,432,631 B2 | 8/2016 | Allegra et al. |
| D765,530 S | 9/2016 | Scalisi |
| 9,449,229 B1 | 9/2016 | Laska et al. |
| 9,479,822 B2 | 10/2016 | Laska et al. |
| 9,516,053 B1 | 12/2016 | Muddu et al. |
| 9,575,178 B2 | 2/2017 | Kanamori et al. |
| D782,495 S | 3/2017 | Laska et al. |
| 9,600,723 B1 | 3/2017 | Pantofaru et al. |
| 9,602,860 B2 | 3/2017 | Laska et al. |
| 9,613,524 B1 | 4/2017 | Lamb et al. |
| 9,621,798 B2 | 4/2017 | Zhang et al. |
| 9,628,286 B1 | 4/2017 | Nguyen et al. |
| D789,363 S | 6/2017 | Jentz et al. |
| D789,364 S | 6/2017 | Jentz et al. |
| D789,365 S | 6/2017 | Jentz et al. |
| D789,366 S | 6/2017 | Jentz et al. |
| D789,367 S | 6/2017 | Jentz et al. |
| 9,674,453 B1 | 6/2017 | Tangeland et al. |
| D793,268 S | 8/2017 | Ye |
| D795,109 S | 8/2017 | Olodort et al. |
| 9,753,994 B2 | 9/2017 | Anderson |
| D800,201 S | 10/2017 | Song |
| D805,570 S | 12/2017 | Shi |
| D806,154 S | 12/2017 | Shi |
| 9,940,523 B2 | 4/2018 | Laska et al. |
| 9,997,053 B2 | 6/2018 | Maneskiold et al. |
| 10,063,815 B1 | 8/2018 | Spivey et al. |
| 10,108,862 B2 | 10/2018 | Laska et al. |
| 10,192,415 B2 | 1/2019 | Heitz et al. |
| 10,289,917 B1 | 5/2019 | Fu et al. |
| 10,303,278 B2 | 5/2019 | Cheng et al. |
| 10,309,145 B2 | 6/2019 | Castro et al. |
| 10,380,429 B2 | 8/2019 | Chaudhry et al. |

(56) References Cited

U.S. PATENT DOCUMENTS

| | | |
|---|---|---|
| 10,410,086 B2 | 9/2019 | Bapat et al. |
| 10,462,341 B1 | 10/2019 | Fu et al. |
| 10,475,311 B2 | 11/2019 | Siminoff |
| 10,555,393 B1 | 2/2020 | Fu et al. |
| 10,599,950 B2 | 3/2020 | Bapat et al. |
| 10,657,382 B2 | 5/2020 | Chaudhry et al. |
| 10,664,688 B2 | 5/2020 | Goulden et al. |
| 10,674,119 B2 | 6/2020 | Scalisi et al. |
| 10,685,257 B2 | 6/2020 | Bapat et al. |
| 10,708,472 B2 | 7/2020 | Jeong et al. |
| 10,965,899 B1 | 3/2021 | Bart |
| 10,986,717 B1 | 4/2021 | Fu et al. |
| 11,134,227 B2 | 9/2021 | Goulden et al. |
| 11,256,908 B2 | 2/2022 | Goulden et al. |
| 11,256,951 B2 | 2/2022 | Bapat et al. |
| 11,356,643 B2 | 6/2022 | Goulden et al. |
| 11,386,285 B2 | 7/2022 | Bapat et al. |
| 11,587,320 B2 | 2/2023 | Chaudhry et al. |
| 11,710,387 B2 | 7/2023 | Goulden et al. |
| 11,783,010 B2 | 10/2023 | Bapat et al. |
| 12,125,369 B2 | 10/2024 | Goulden et al. |
| 12,542,874 B2 | 2/2026 | Chaudhry et al. |
| 2001/0010541 A1 | 8/2001 | Fernandez et al. |
| 2001/0019631 A1 | 9/2001 | Ohsawa et al. |
| 2001/0024517 A1 | 9/2001 | Labelle |
| 2001/0043721 A1 | 11/2001 | Kravets et al. |
| 2002/0002425 A1 | 1/2002 | Dossey et al. |
| 2002/0030740 A1 | 3/2002 | Arazi et al. |
| 2002/0054068 A1 | 5/2002 | Ellis et al. |
| 2002/0054211 A1 | 5/2002 | Edelson et al. |
| 2002/0089549 A1 | 7/2002 | Munro et al. |
| 2002/0113813 A1 | 8/2002 | Yoshimine |
| 2002/0125435 A1 | 9/2002 | Cofer et al. |
| 2002/0126224 A1 | 9/2002 | Lienhart |
| 2002/0168084 A1 | 11/2002 | Trajkovic et al. |
| 2002/0174367 A1 | 11/2002 | Kimmel et al. |
| 2003/0025599 A1 | 2/2003 | Monroe |
| 2003/0035592 A1 | 2/2003 | Cornog et al. |
| 2003/0043160 A1 | 3/2003 | Elfving et al. |
| 2003/0053658 A1 | 3/2003 | Pavlidis |
| 2003/0058339 A1 | 3/2003 | Trajkovic et al. |
| 2003/0063093 A1 | 4/2003 | Howard |
| 2003/0095183 A1 | 5/2003 | Roberts et al. |
| 2003/0101104 A1 | 5/2003 | Dimitrova et al. |
| 2003/0103647 A1 | 6/2003 | Rui et al. |
| 2003/0133503 A1 | 7/2003 | Paniconi et al. |
| 2003/0135525 A1 | 7/2003 | Huntington et al. |
| 2003/0218696 A1 | 11/2003 | Bagga et al. |
| 2004/0021647 A1 | 2/2004 | Iwema et al. |
| 2004/0032494 A1 | 2/2004 | Ito et al. |
| 2004/0060063 A1 | 3/2004 | Russ et al. |
| 2004/0100560 A1 | 5/2004 | Stavely et al. |
| 2004/0109059 A1 | 6/2004 | Kawakita |
| 2004/0123328 A1 | 6/2004 | Coffey et al. |
| 2004/0125908 A1 | 7/2004 | Cesmeli |
| 2004/0133647 A1 | 7/2004 | Ozkan et al. |
| 2004/0143602 A1 | 7/2004 | Ruiz et al. |
| 2004/0145658 A1 | 7/2004 | Lev-Ran et al. |
| 2004/0153670 A1 | 8/2004 | Casey et al. |
| 2004/0174434 A1 | 9/2004 | Walker et al. |
| 2004/0196369 A1 | 10/2004 | Fukasawa et al. |
| 2004/0229569 A1 | 11/2004 | Franz |
| 2005/0005308 A1 | 1/2005 | Logan et al. |
| 2005/0018879 A1 | 1/2005 | Ito et al. |
| 2005/0046699 A1 | 3/2005 | Oya et al. |
| 2005/0047672 A1 | 3/2005 | Ben-Ezra et al. |
| 2005/0057653 A1 | 3/2005 | Maruya |
| 2005/0074140 A1 | 4/2005 | Grasso et al. |
| 2005/0078868 A1 | 4/2005 | Chen et al. |
| 2005/0104958 A1 | 5/2005 | Egnal et al. |
| 2005/0132414 A1 | 6/2005 | Bentley et al. |
| 2005/0146605 A1 | 7/2005 | Lipton et al. |
| 2005/0151851 A1 | 7/2005 | Schnell |
| 2005/0157949 A1 | 7/2005 | Aiso et al. |
| 2005/0162515 A1 | 7/2005 | Venetianer et al. |
| 2005/0195331 A1 | 9/2005 | Sugano |
| 2005/0200486 A1 | 9/2005 | Greer |
| 2005/0207733 A1 | 9/2005 | Gargi |
| 2005/0246119 A1 | 11/2005 | Koodali |
| 2005/0248443 A1 | 11/2005 | Steinetz et al. |
| 2005/0280711 A1 | 12/2005 | Ishii et al. |
| 2005/0285734 A1 | 12/2005 | Sheynman et al. |
| 2006/0007051 A1 | 1/2006 | Bear et al. |
| 2006/0028548 A1 | 2/2006 | Salivar et al. |
| 2006/0029363 A1 | 2/2006 | Iggulden et al. |
| 2006/0038663 A1 | 2/2006 | Steinetz et al. |
| 2006/0045185 A1 | 3/2006 | Kiryati et al. |
| 2006/0045354 A1 | 3/2006 | Hanna et al. |
| 2006/0053342 A1 | 3/2006 | Bazakos et al. |
| 2006/0056056 A1 | 3/2006 | Ahiska et al. |
| 2006/0063517 A1 | 3/2006 | Oh et al. |
| 2006/0067585 A1 | 3/2006 | Pace |
| 2006/0072847 A1 | 4/2006 | Chor et al. |
| 2006/0093998 A1 | 5/2006 | Vertegaal |
| 2006/0109341 A1 | 5/2006 | Evans |
| 2006/0148528 A1 | 7/2006 | Jung et al. |
| 2006/0164561 A1 | 7/2006 | Lacy et al. |
| 2006/0171453 A1 | 8/2006 | Rohlfing et al. |
| 2006/0195716 A1 | 8/2006 | Bittner |
| 2006/0227862 A1 | 10/2006 | Campbell et al. |
| 2006/0227997 A1 | 10/2006 | Au et al. |
| 2006/0228015 A1 | 10/2006 | Brockway et al. |
| 2006/0233448 A1 | 10/2006 | Pace et al. |
| 2006/0239645 A1 | 10/2006 | Curtner et al. |
| 2006/0243798 A1 | 11/2006 | Kundu et al. |
| 2006/0274949 A1 | 12/2006 | Gallagher et al. |
| 2006/0285596 A1 | 12/2006 | Kondo |
| 2006/0291694 A1 | 12/2006 | Venetianer et al. |
| 2007/0002141 A1 | 1/2007 | Lipton et al. |
| 2007/0008099 A1 | 1/2007 | Kimmel et al. |
| 2007/0014554 A1 | 1/2007 | Sasaki |
| 2007/0033632 A1 | 2/2007 | Baynger et al. |
| 2007/0035622 A1 | 2/2007 | Hanna et al. |
| 2007/0038570 A1 | 2/2007 | Halbritter et al. |
| 2007/0041727 A1 | 2/2007 | Lee et al. |
| 2007/0058040 A1 | 3/2007 | Zhang et al. |
| 2007/0061862 A1 | 3/2007 | Berger et al. |
| 2007/0086669 A1 | 4/2007 | Berger et al. |
| 2007/0101269 A1 | 5/2007 | Hua et al. |
| 2007/0132558 A1 | 6/2007 | Rowe et al. |
| 2007/0186238 A1 | 8/2007 | Schrager et al. |
| 2007/0216764 A1 | 9/2007 | Kwak |
| 2007/0220569 A1 | 9/2007 | Ishii |
| 2007/0223874 A1 | 9/2007 | Hentschel |
| 2007/0255742 A1 | 11/2007 | Perez et al. |
| 2007/0257986 A1 | 11/2007 | Ivanov et al. |
| 2007/0268369 A1 | 11/2007 | Amano et al. |
| 2008/0044085 A1 | 2/2008 | Yamamoto |
| 2008/0051648 A1 | 2/2008 | Suri et al. |
| 2008/0122926 A1 | 5/2008 | Zhou et al. |
| 2008/0170123 A1 | 7/2008 | Albertson et al. |
| 2008/0178069 A1 | 7/2008 | Stallings |
| 2008/0181453 A1 | 7/2008 | Xu |
| 2008/0184245 A1 | 7/2008 | St-Jean |
| 2008/0192129 A1 | 8/2008 | Walker et al. |
| 2008/0225952 A1 | 9/2008 | Wang et al. |
| 2008/0240579 A1 | 10/2008 | Enomoto |
| 2008/0244453 A1 | 10/2008 | Cafer |
| 2008/0247601 A1 | 10/2008 | Ito et al. |
| 2008/0270363 A1 | 10/2008 | Hunt et al. |
| 2008/0303903 A1 | 12/2008 | Bentley et al. |
| 2008/0316311 A1 | 12/2008 | Albers et al. |
| 2009/0006368 A1 | 1/2009 | Mei et al. |
| 2009/0016599 A1 | 1/2009 | Eaton et al. |
| 2009/0018996 A1 | 1/2009 | Hunt et al. |
| 2009/0033746 A1 | 2/2009 | Brown et al. |
| 2009/0059031 A1 | 3/2009 | Miyakoshi |
| 2009/0060352 A1 | 3/2009 | Distante et al. |
| 2009/0080853 A1 | 3/2009 | Chen |
| 2009/0083787 A1 | 3/2009 | Morris |
| 2009/0100007 A1 | 4/2009 | Campbell et al. |
| 2009/0102924 A1 | 4/2009 | Masten |
| 2009/0103622 A1 | 4/2009 | Tripathi et al. |
| 2009/0128632 A1 | 5/2009 | Goto et al. |

(56) References Cited

U.S. PATENT DOCUMENTS

| | | |
|---|---|---|
| 2009/0141939 A1 | 6/2009 | Chambers et al. |
| 2009/0154806 A1 | 6/2009 | Chang et al. |
| 2009/0158308 A1 | 6/2009 | Weitzenfeld et al. |
| 2009/0207257 A1 | 8/2009 | Jung et al. |
| 2009/0208181 A1 | 8/2009 | Cottrell |
| 2009/0213937 A1 | 8/2009 | Kawase et al. |
| 2009/0232416 A1 | 9/2009 | Murashita |
| 2009/0244291 A1 | 10/2009 | Saptharishi |
| 2009/0244309 A1 | 10/2009 | Maison et al. |
| 2009/0249247 A1 | 10/2009 | Tseng et al. |
| 2009/0262189 A1 | 10/2009 | Marman |
| 2009/0273711 A1 | 11/2009 | Chapdelaine et al. |
| 2009/0278934 A1 | 11/2009 | Ecker et al. |
| 2009/0288011 A1 | 11/2009 | Piran et al. |
| 2009/0292549 A1 | 11/2009 | Ma et al. |
| 2009/0316956 A1 | 12/2009 | Higuchi et al. |
| 2009/0319829 A1 | 12/2009 | Takayama |
| 2010/0002070 A1 | 1/2010 | Ahiska |
| 2010/0002071 A1 | 1/2010 | Ahiska |
| 2010/0002911 A1 | 1/2010 | Wu et al. |
| 2010/0004839 A1 | 1/2010 | Yokoyama et al. |
| 2010/0008547 A1 | 1/2010 | Yagnik et al. |
| 2010/0013943 A1 | 1/2010 | Thorn |
| 2010/0023865 A1 | 1/2010 | Fulker et al. |
| 2010/0026802 A1 | 2/2010 | Titus |
| 2010/0033573 A1 | 2/2010 | Malinovski et al. |
| 2010/0042949 A1 | 2/2010 | Chen |
| 2010/0045594 A1 | 2/2010 | Jenks et al. |
| 2010/0060715 A1 | 3/2010 | Laasik et al. |
| 2010/0066822 A1 | 3/2010 | Steingberg et al. |
| 2010/0098165 A1 | 4/2010 | Farfade et al. |
| 2010/0114623 A1 | 5/2010 | Bobbitt et al. |
| 2010/0128927 A1 | 5/2010 | Ikenoue |
| 2010/0133008 A1 | 6/2010 | Gawski et al. |
| 2010/0141763 A1 | 6/2010 | Itoh et al. |
| 2010/0162114 A1 | 6/2010 | Roth |
| 2010/0166260 A1 | 7/2010 | Huang et al. |
| 2010/0192212 A1 | 7/2010 | Raleigh |
| 2010/0201815 A1 | 8/2010 | Anderson et al. |
| 2010/0205203 A1 | 8/2010 | Anderson et al. |
| 2010/0210240 A1 | 8/2010 | Mahaffey et al. |
| 2010/0214442 A1 | 8/2010 | Uemura et al. |
| 2010/0245107 A1 | 9/2010 | Fulker et al. |
| 2010/0288468 A1 | 11/2010 | Patel et al. |
| 2010/0304731 A1 | 12/2010 | Bratton et al. |
| 2011/0001605 A1 | 1/2011 | Kiani et al. |
| 2011/0025852 A1 | 2/2011 | Tanaka |
| 2011/0035054 A1 | 2/2011 | Gal et al. |
| 2011/0050901 A1 | 3/2011 | Oya |
| 2011/0058708 A1 | 3/2011 | Ikenoue |
| 2011/0069175 A1 | 3/2011 | Mistretta et al. |
| 2011/0107364 A1 | 5/2011 | Lajoie et al. |
| 2011/0149078 A1 | 6/2011 | Fan et al. |
| 2011/0167369 A1 | 7/2011 | Van Os |
| 2011/0173235 A1 | 7/2011 | Aman et al. |
| 2011/0176043 A1 | 7/2011 | Baker et al. |
| 2011/0199488 A1 | 8/2011 | Gorilovskij et al. |
| 2011/0199535 A1 | 8/2011 | Isu et al. |
| 2011/0211563 A1 | 9/2011 | Herrala et al. |
| 2011/0231428 A1 | 9/2011 | Kuramura |
| 2011/0235998 A1 | 9/2011 | Pond et al. |
| 2011/0254950 A1 | 10/2011 | Bibby et al. |
| 2011/0254972 A1 | 10/2011 | Yaguchi |
| 2011/0255741 A1 | 10/2011 | Jung et al. |
| 2011/0255775 A1 | 10/2011 | McNamer et al. |
| 2011/0276881 A1 | 11/2011 | Keng et al. |
| 2011/0291925 A1 | 12/2011 | Israel |
| 2011/0300933 A1 | 12/2011 | Chien et al. |
| 2011/0312350 A1 | 12/2011 | Agerholm |
| 2012/0005628 A1 | 1/2012 | Isozu et al. |
| 2012/0011567 A1 | 1/2012 | Cronk et al. |
| 2012/0019728 A1 | 1/2012 | Moore |
| 2012/0045090 A1 | 2/2012 | Bobbitt et al. |
| 2012/0052972 A1 | 3/2012 | Bentley |
| 2012/0098918 A1 | 4/2012 | Murphy |
| 2012/0120238 A1 | 5/2012 | Adar et al. |
| 2012/0121187 A1 | 5/2012 | Lee et al. |
| 2012/0173577 A1 | 7/2012 | Millar |
| 2012/0176496 A1 | 7/2012 | Carbonell et al. |
| 2012/0195363 A1 | 8/2012 | Laganiere et al. |
| 2012/0198319 A1 | 8/2012 | Agnoli et al. |
| 2012/0216296 A1 | 8/2012 | Kidron |
| 2012/0257000 A1 | 10/2012 | Singhai |
| 2012/0280783 A1 | 11/2012 | Gerhardt et al. |
| 2013/0016122 A1 | 1/2013 | Bhatt et al. |
| 2013/0027581 A1 | 1/2013 | Price et al. |
| 2013/0050461 A1 | 2/2013 | Wada et al. |
| 2013/0057695 A1 | 3/2013 | Huisking |
| 2013/0076908 A1 | 3/2013 | Bratton et al. |
| 2013/0083198 A1 | 4/2013 | Maslan |
| 2013/0086665 A1 | 4/2013 | Filippi et al. |
| 2013/0088616 A1 | 4/2013 | Ingrassia |
| 2013/0125039 A1 | 5/2013 | Murata |
| 2013/0128022 A1 | 5/2013 | Bose et al. |
| 2013/0145270 A1 | 6/2013 | Piran et al. |
| 2013/0176430 A1 | 7/2013 | Zhu et al. |
| 2013/0182905 A1 | 7/2013 | Myers et al. |
| 2013/0201329 A1 | 8/2013 | Thornton et al. |
| 2013/0202210 A1 | 8/2013 | Ryoo et al. |
| 2013/0242093 A1 | 9/2013 | Cobb et al. |
| 2013/0243322 A1 | 9/2013 | Noh et al. |
| 2013/0266292 A1 | 10/2013 | Sandrew et al. |
| 2013/0268357 A1 | 10/2013 | Heath |
| 2013/0276140 A1 | 10/2013 | Coffing et al. |
| 2013/0279810 A1 | 10/2013 | Li et al. |
| 2013/0279884 A1 | 10/2013 | Gifford |
| 2013/0301939 A1 | 11/2013 | Ochi et al. |
| 2013/0340050 A1 | 12/2013 | Harrison |
| 2013/0342689 A1 | 12/2013 | Sanjay et al. |
| 2014/0007222 A1 | 1/2014 | Qureshi et al. |
| 2014/0013243 A1 | 1/2014 | Flynn, III et al. |
| 2014/0043534 A1 | 2/2014 | Nakoaka |
| 2014/0044404 A1 | 2/2014 | Grundmann et al. |
| 2014/0049371 A1 | 2/2014 | Tung |
| 2014/0050406 A1 | 2/2014 | Buehler et al. |
| 2014/0053200 A1 | 2/2014 | de Paz et al. |
| 2014/0055610 A1 | 2/2014 | Ko et al. |
| 2014/0056479 A1 | 2/2014 | Bobbitt et al. |
| 2014/0068349 A1 | 3/2014 | Scott et al. |
| 2014/0068705 A1 | 3/2014 | Chambers et al. |
| 2014/0068789 A1 | 3/2014 | Watts et al. |
| 2014/0075370 A1 | 3/2014 | Guerin et al. |
| 2014/0082497 A1 | 3/2014 | Chalouhi et al. |
| 2014/0085088 A1 | 3/2014 | Graphenius |
| 2014/0098227 A1 | 4/2014 | Chen et al. |
| 2014/0098992 A1 | 4/2014 | Yagi et al. |
| 2014/0105564 A1 | 4/2014 | Johar |
| 2014/0129942 A1 | 5/2014 | Rathod |
| 2014/0137188 A1 | 5/2014 | Bartholomay et al. |
| 2014/0142907 A1 | 5/2014 | Gellaboina et al. |
| 2014/0146125 A1 | 5/2014 | Kristiansen et al. |
| 2014/0149078 A1 | 5/2014 | Lee et al. |
| 2014/0157370 A1 | 6/2014 | Plattner et al. |
| 2014/0160294 A1 | 6/2014 | Naylor |
| 2014/0172906 A1 | 6/2014 | Sud et al. |
| 2014/0173692 A1 | 6/2014 | Srinivasan et al. |
| 2014/0189808 A1 | 7/2014 | Mahaffey et al. |
| 2014/0198237 A1 | 7/2014 | Noyes |
| 2014/0210646 A1 | 7/2014 | Subramanua |
| 2014/0240504 A1 | 8/2014 | Cho |
| 2014/0245411 A1 | 8/2014 | Meng et al. |
| 2014/0245461 A1 | 8/2014 | O'Neill et al. |
| 2014/0254863 A1 | 9/2014 | Marks et al. |
| 2014/0282877 A1 | 9/2014 | Mahaffey et al. |
| 2014/0289376 A1 | 9/2014 | Chan et al. |
| 2014/0300722 A1 | 10/2014 | Garcia |
| 2014/0310277 A1 | 10/2014 | Ricci |
| 2014/0313142 A1 | 10/2014 | Yairi |
| 2014/0313542 A1 | 10/2014 | Benchorin et al. |
| 2014/0320740 A1 | 10/2014 | Wan et al. |
| 2014/0333775 A1 | 11/2014 | Naikal et al. |
| 2014/0339374 A1 | 11/2014 | Mian et al. |
| 2014/0347475 A1 | 11/2014 | Divakaran et al. |
| 2014/0376876 A1 | 12/2014 | Bentley et al. |

(56) References Cited

U.S. PATENT DOCUMENTS

| | | | |
|---|---|---|---|
| 2015/0022432 A1 | 1/2015 | Steward et al. |
| 2015/0022660 A1 | 1/2015 | Kavadeles |
| 2015/0029335 A1 | 1/2015 | Kasmir et al. |
| 2015/0042570 A1 | 2/2015 | Lombardi et al. |
| 2015/0046184 A1 | 2/2015 | Cocco et al. |
| 2015/0052029 A1 | 2/2015 | Wu et al. |
| 2015/0054949 A1 | 2/2015 | Scalisi |
| 2015/0054981 A1 | 2/2015 | Saiki et al. |
| 2015/0074535 A1 | 3/2015 | Siberstein et al. |
| 2015/0081548 A1 | 3/2015 | Robinet |
| 2015/0098613 A1 | 4/2015 | Gagvani |
| 2015/0106947 A1 | 4/2015 | Holman et al. |
| 2015/0109104 A1 | 4/2015 | Fadell et al. |
| 2015/0112885 A1 | 4/2015 | Fadell et al. |
| 2015/0116108 A1 | 4/2015 | Fadell et al. |
| 2015/0120656 A1 | 4/2015 | Ramnarayanan et al. |
| 2015/0127712 A1 | 5/2015 | Fadell et al. |
| 2015/0138353 A1 | 5/2015 | Yang et al. |
| 2015/0156030 A1 | 6/2015 | Fadell et al. |
| 2015/0156031 A1 | 6/2015 | Fadell et al. |
| 2015/0181088 A1 | 6/2015 | Wu et al. |
| 2015/0194134 A1 | 7/2015 | Dureau et al. |
| 2015/0201152 A1 | 7/2015 | Cho et al. |
| 2015/0222820 A1 | 8/2015 | Costigan et al. |
| 2015/0228167 A1 | 8/2015 | Scallisi et al. |
| 2015/0234571 A1 | 8/2015 | Lee et al. |
| 2015/0235551 A1 | 8/2015 | Maneskiold et al. |
| 2015/0242687 A1 | 8/2015 | Seo |
| 2015/0242994 A1 | 8/2015 | Shen et al. |
| 2015/0279182 A1 | 10/2015 | Kanaujia et al. |
| 2015/0325067 A1 | 11/2015 | Lee |
| 2015/0339702 A1 | 11/2015 | Lin et al. |
| 2015/0341599 A1 | 11/2015 | Carey |
| 2015/0363989 A1 | 12/2015 | Scalisi |
| 2016/0006932 A1 | 1/2016 | Zhang et al. |
| 2016/0006988 A1 | 1/2016 | Zhao |
| 2016/0026862 A1 | 1/2016 | Anderson |
| 2016/0027196 A1 | 1/2016 | Schiffer et al. |
| 2016/0041724 A1 | 2/2016 | Kirkby et al. |
| 2016/0042621 A1 | 2/2016 | Hogg |
| 2016/0072831 A1 | 3/2016 | Rieke |
| 2016/0092737 A1 | 3/2016 | Laska et al. |
| 2016/0092738 A1 | 3/2016 | Laska et al. |
| 2016/0103559 A1 | 4/2016 | Maheshwari et al. |
| 2016/0103887 A1 | 4/2016 | Fletcher et al. |
| 2016/0110612 A1 | 4/2016 | Sabripour |
| 2016/0110772 A1 | 4/2016 | Herring et al. |
| 2016/0117951 A1 | 4/2016 | Fleisher et al. |
| 2016/0189531 A1 | 6/2016 | Modi |
| 2016/0195716 A1 | 7/2016 | Nakanuma |
| 2016/0219248 A1 | 7/2016 | Reznik et al. |
| 2016/0235344 A1 | 8/2016 | Auerbach |
| 2016/0239723 A1 | 8/2016 | Ge |
| 2016/0241818 A1 | 8/2016 | Palanisamy et al. |
| 2016/0274771 A1 | 9/2016 | Seong et al. |
| 2016/0283743 A1 | 9/2016 | Rueger et al. |
| 2016/0307418 A1 | 10/2016 | Pantus |
| 2016/0308872 A1 | 10/2016 | Mathur |
| 2016/0316176 A1 | 10/2016 | Laska et al. |
| 2016/0316256 A1 | 10/2016 | Laska et al. |
| 2016/0321257 A1 | 11/2016 | Chen et al. |
| 2016/0321889 A1 | 11/2016 | Gagvani |
| 2016/0335861 A1 | 11/2016 | Shimura |
| 2016/0360116 A1 | 12/2016 | Penha et al. |
| 2016/0364966 A1 | 12/2016 | Dixon et al. |
| 2016/0366036 A1 | 12/2016 | Gupta |
| 2016/0371534 A1 | 12/2016 | Koul et al. |
| 2017/0019605 A1 | 1/2017 | Wang et al. |
| 2017/0039729 A1 | 2/2017 | Wang et al. |
| 2017/0048495 A1 | 2/2017 | Scalisi |
| 2017/0084132 A1 | 3/2017 | Scalisi |
| 2017/0085843 A1 | 3/2017 | Scalisi et al. |
| 2017/0109983 A1 | 4/2017 | Flint et al. |
| 2017/0111494 A1 | 4/2017 | Kidron et al. |
| 2017/0123492 A1 | 5/2017 | Marggraff et al. |

| | | | |
|---|---|---|---|
| 2017/0162230 A1 | 6/2017 | Maliuk et al. |
| 2017/0163929 A1 | 6/2017 | Maliuk et al. |
| 2017/0180678 A1 | 6/2017 | Fish et al. |
| 2017/0195130 A1 | 7/2017 | Landow et al. |
| 2017/0195640 A1 | 7/2017 | Pasternak |
| 2017/0228289 A1 | 8/2017 | Akbulut et al. |
| 2017/0257612 A1 | 9/2017 | Emeott et al. |
| 2017/0272706 A1 | 9/2017 | Jeong |
| 2017/0301203 A1 | 10/2017 | Matsuura |
| 2018/0004784 A1 | 1/2018 | Tompkins |
| 2018/0012462 A1 | 1/2018 | Heitz et al. |
| 2018/0012463 A1 | 1/2018 | Chaudhry et al. |
| 2018/0089328 A1 | 3/2018 | Bath et al. |
| 2018/0096197 A1 | 4/2018 | Kephart |
| 2018/0121035 A1 | 5/2018 | Filippi |
| 2018/0139332 A1 | 5/2018 | Kerzner |
| 2018/0144314 A1 | 5/2018 | Miller |
| 2018/0182148 A1 | 6/2018 | Yanagisawa |
| 2018/0218053 A1 | 8/2018 | Koneru |
| 2018/0219897 A1 | 8/2018 | Muddu et al. |
| 2018/0247504 A1 | 8/2018 | Siminoff |
| 2018/0249134 A1 | 8/2018 | Siminoff et al. |
| 2018/0322405 A1 | 11/2018 | Fadell et al. |
| 2018/0330169 A1 | 11/2018 | van Hoof et al. |
| 2018/0350213 A1 | 12/2018 | Bart et al. |
| 2019/0004639 A1 | 1/2019 | Faulkner |
| 2019/0035187 A1 | 1/2019 | Kim et al. |
| 2019/0087646 A1 * | 3/2019 | Goulden ................. G06F 18/22 |
| 2019/0089934 A1 | 3/2019 | Goulden et al. |
| 2019/0325228 A1 | 10/2019 | Chaudhry et al. |
| 2020/0226416 A1 | 7/2020 | Bapat et al. |
| 2020/0279459 A1 | 9/2020 | Singh et al. |
| 2020/0285841 A1 | 9/2020 | Goulden et al. |
| 2020/0293818 A1 | 9/2020 | Bapat et al. |
| 2020/0380265 A1 | 12/2020 | Chaundry et al. |
| 2020/0380299 A1 | 12/2020 | Hu et al. |
| 2021/0081657 A1 | 3/2021 | Zhang et al. |
| 2021/0174095 A1 | 6/2021 | Kong et al. |
| 2021/0203887 A1 | 7/2021 | Nathan et al. |
| 2021/0377493 A1 | 12/2021 | Goulden et al. |
| 2022/0215725 A1 | 7/2022 | Jackson et al. |
| 2022/0237948 A1 | 7/2022 | Goulden et al. |
| 2022/0245396 A1 | 8/2022 | Bapat et al. |
| 2022/0247978 A1 | 8/2022 | Goulden et al. |
| 2022/0300753 A1 | 9/2022 | Bapat et al. |
| 2023/0209017 A1 | 6/2023 | Chaudhry et al. |
| 2023/0306826 A1 | 9/2023 | Goulden et al. |
| 2023/0418908 A1 | 12/2023 | Bapat et al. |
| 2025/0029460 A1 | 1/2025 | Goulden et al. |

FOREIGN PATENT DOCUMENTS

| | | | |
|---|---|---|---|
| WO | 2007011709 | 1/2007 | |
| WO | 2009138037 | 11/2009 | |
| WO | 2010198755 | 9/2010 | |
| WO | 2011044171 | 3/2011 | |
| WO | 2012048689 | 3/2012 | |
| WO | 104794834 | 7/2015 | |
| WO | 105612564 | 5/2016 | |
| WO | 2016205213 | 12/2016 | |
| WO | 2017078793 | 5/2017 | |
| WO | 2020236151 | 11/2020 | |
| WO | 2021146703 | 7/2021 | |
| WO | WO-2021146703 A1 * | 7/2021 | ............ G06N 3/045 |

OTHER PUBLICATIONS

"Clustered/Stacked Filled Bar Graph Generator", http://www.burningcutlery.com/derek/bargraph/, Mar. 24, 2014, 16 pages.
"Configuring Main System—Chapter 1", (GEOVision) 2009—https://videos.cctvcamerapros.com/pdf/geovision/geovision-8-manual-ch1.pdf, 79 pages.
"EP Patent Certificate", EP Patent No. 3022720, Jan. 31, 2018, 1 page.
"Extended European Search Report", EP Application No. 18156967.4, Oct. 17, 2018, 12 pages.
"Extended European Search Report", EP Application No. 18172420.4, Nov. 26, 2018, 8 pages.

(56) References Cited

OTHER PUBLICATIONS

"FI8921W email notification and motion alarm", http://foscam.us/forum/fi8921w-email-notification-and-motion-alarm-t5874.html, Jun. 4, 2013, 2 pages.

"File:savedemo.png", https://wiki.freepascal.org/File:savedemo.png, Apr. 3, 2014, 2 pages.

"Foreign Office Action", EP Application No. 18732516.2, May 4, 2021, 5 pages.

"Foreign Office Action", EP Application No. 18769880.8, May 17, 2022, 5 pages.

"Foreign Office Action", CN Application No. 201880033972.7, Jan. 28, 2021, 8 pages.

"Graph Maker", Retrieved at: https://forum.unity.com/threads/released-graph-maker-ugui-ngui-dfgui-line-graphs-bar-gaphs-pie-graphs-etc.202437—on Dec. 20, 2018, 21 pages.

"Histograms", Retrieved at: https://root.cern.ch/root/htmldoc/guides/users-guide/Histograms.html—on Dec. 20, 2018, 55 pages.

"How to set up motion detection in a Mobotix network camera", https://www.networkwebcams.co.uk/blog/2010/03/03/setting-up-motion-detection-mobotix/, Mar. 3, 2010, 5 pages.

"How to Setup Motion Detection on your D-Link Camera", http://blog.dlink.com/how-to-set-up-motion-detection-on-your-d-link-camera, Apr. 9, 2014, 8 pages.

"Incremental Learning Techniques Within a Self-updating Approach for Face Verification in Video-Surveillance", Sep. 2019, 19 pages.

"International Search Report and Written Opinion", Application No. PCT/US2015/039425, Sep. 28, 2015, 12 pages.

"International Search Report and Written Opinion", Application No. PCT/US2022/074367, Dec. 2, 2022, 14 pages.

"International Search Report and Written Opinion", Application No. PCT/US2018/046811, Mar. 14, 2019, 16 pages.

"International Search Report and Written Opinion", Application No. PCT/US2018/032770, Nov. 2, 2018, 18 pages.

"IZON App Guide", www.izoncam.com/wp-content/uploads/2014/06/IZON-App-Guide.pdf, Jun. 2014, 30 pages.

"Logitech Alert Video Security System: Getting to Know", https://docplayer.net/19510884-Logitech-alert-video-security-system-getting-to-know.html, 2010, 9 pages.

"Main Request and First Auxiliary", EP Application No. 18156967.4, Oct. 15, 2021, 36 pages.

"Motion Detection Setting up Motion Detection", https://www.ispyconnect.com/userguide-motion-detection.aspx, Dec. 11, 2011, 4 pages.

"Non-Final Office Action", U.S. Appl. No. 16/877,115, Jan. 21, 2022, 12 pages.

"Non-Final Office Action", U.S. Appl. No. 16/888,379, filed Oct. 28, 2021, 14 pages.

"Non-Final Office Action", U.S. Appl. No. 17/805,713, Jun. 6, 2023, 21 pages.

"Non-Final Office Action", U.S. Appl. No. 16/827,290, filed Jul. 20, 2021, 8 pages.

"Notice of Allowance", U.S. Appl. No. 16/877,115, Sep. 16, 2022, 7 pages.

"Notice of Allowance", U.S. Appl. No. 17/400,887, filed Dec. 27, 2021, 7 pages.

"Notice of Allowance", U.S. Appl. No. 16/888,379, filed Mar. 9, 2022, 8 pages.

"Notice of Allowance", U.S. Appl. No. 16/883,932, filed Oct. 14, 2021, 8 pages.

"Notice of Allowance", U.S. Appl. No. 16/827,290, filed Oct. 14, 2021, 9 pages.

"Notification of Registration, 004086437", Google, Jul. 13, 2017, 6 pages.

"Patent Certificate for Design", Certificate No. 4493940, Patent No. Z201730288012.3, Jan. 30, 2018, 1 page.

"Prosecution History", U.S. Appl. No. 15/809,924, Jun. 4, 2019 through Apr. 24, 2020, 61 pages.

"Prosecution History from U.S. Appl. No. 15/207,459", Nov. 20, 2018 through Jul. 2, 2019, 42 pages.

"Prosecution History from U.S. Appl. No. 15/676,868", Nov. 15, 2018 through Feb. 28, J020, 53 pages.

"Prosecution History from U.S. Appl. No. 15/809,900", Jun. 17, 20019 through May 27, 2021, 133 pages.

"Prosecution History from U.S. Appl. No. 16/565,365", Oct. 29, 2019 through Mar. 31, 2020, 39 pages.

"Prosecution History from U.S. Appl. No. 16/460,706", Jul. 29, 2019 through Jan. 13, 2020, 34 pages.

"Recognizing People in Photos Through Private On-Device Machine Learning", Accessed online at: https://machinelearning.apple.com/research/recognizing-people-photos on Jul. 27, 2021, Jul. 2021, 13 pages.

"Response to Foreign Office Action", EP Application No. 18732516.2, Aug. 27, 2021, 15 pages.

"Response to Summons to Attend Oral Proceedings", EP Application No. 18156967.4, Apr. 22, 2021, 14 pages.

"Second and Third Auxiliary", EP Application No. 18156967.4, Oct. 15, 2021, 47 pages.

"Systems and Methods of Presenting Appropriate Actions for Responding to a Visitor to a Smart Home Environment", U.S. Appl. No. 17/400,887, filed Aug. 12, 2021, 75 pages.

"Words of Estimative Probability", https://www.cia.gov/library/center-for- the-study-of-intelligence/csi-publications/books-and-monographs/sherman-kent-and-the-board-of-national-estimates-collected-essays/6words.html, May 25, 2018, 11 pages.

"You Tube, Sky News Live", (screenshot of website illustrating live stream video with timeline having preview thumbnail of past images within the stream) retrieved at: https://www.youtube.com/watch?v=9Auq9mYxFEE, Aug. 10, 2015, 2 pages.

Akhtar, Zahid , "Biometric Template Update Under Facial Aging", Jan. 2015, 7 pages.

Ballan, Lamberto , "Event Detection and Recognition for Semantic Annotation of Video", Nov. 2011, pp. 279-302.

Birk, Yitzhak , "Deterministic Load-Balancing Schemes for Disk-Based Video-on-Demand Storage Servers", Sep. 1995, 10 pages.

Buzan, Dan , "Extraction and Clustering of Motion Trajectories in Video", Apr. 23, 2004, 4 pages.

Camplani, Massimo et al., "Accurate depth-color scene modeling for 3D contents generation with low cost depth cameras", Oct. 2012, 5 pages.

Castellanos Jimenez, , "Event detection in video using motion analysis", Oct. 2010, pp. 57-62.

Chen, Chao , "Framework Optimization for Face Recognition", Nov. 2020, 19 pages.

Delbruck, Tobi , "Frame-free dynamic digital vision", Mar. 2008, 6 pages.

Ellis, T J. et al., "Model-Based Vision for Automatic Interpretation", Nov. 1990, pp. 62-67.

Franco, Annalisa et al., "Incremental Template Updating for Face Recognition in Home Environments", Aug. 2010, 13 pages.

Google, , "Notification of Registration", EU 004086437, Jul. 13, 2017, 6 pages.

Google, , "Patent Certificate for Design", Certificate No. 4493940, Jan. 30, 2018, 1 page.

Gresham, Jim , "Review: iZon wi-fi Video monitor and its companion iOS app", https://www.idownloadblog.com/2012/11/21/stem-izon-review/, Nov. 21, 2012, 17 pages.

Halliquist, , "How do I set up Activity Alerts", http://support.dropcam.com/entries/27880086-How-do-i-set-up-Activity-Alerts, 2013, 3 pages.

Hamami, F et al., "Implementation Face Recognition Attendance Monitoring System for Lab Surveillance with Hash Encryption", Aug. 2020, 7 pages.

Ivanov, Yuri et al., "Toward Spatial Queries for Spatial Surveillance Tasks", Jan. 2006, 9 pages.

Jahangir, Akm et al., "A Smart IoT for Smart-Home Using Motion Detection and Facial Recognition", Jul. 2020, pp. 1065-1071.

Jiang, Yu-Gang et al., "High-Level Event Recognition in Unconstrained Videos", Nov. 2012, pp. 73-101.

Kumar, K. N. K. , "Motion activated security camera using raspberry Pi", Apr. 2017, 4 pages.

Li, L et al., "Statistical Modeling of Complex Backgrounds for Foreground Object Detection", Nov. 2004, pp. 1459-1472.

(56)     References Cited

OTHER PUBLICATIONS

Medioni, Gerard et al., "Event Detection and Analysis from Video Streams", Sep. 2001, 10 pages.

Oh, Jimmy , "Literature Review—Graphical Tool", https://www.stat.auckland.ac.nz/~joh024/LitReviews/LitReview_GraphicalTools.pdf, Jan. 2012, 23 pages.

Ross, David et al., "Incremental Learning for Robust Visual Tracking", May 2008, 8 pages.

Schraml, Stephan et al., "A Spatio-temporal Clustering Method Using Real-Time Motion Analysis on Event-Based 3D Vision", Jul. 2010, 7 pages.

Shim, Young-Bin et al., "A Study on Surveillance System of Object's Abnormal Behavior by Blob Composition Analysis", Mar. 2014, pp. 333-340.

Mllier, Marie-Bernadette , "Amplification of the Antibody Response by C3b Complexed to Antigen Through an Ester Link", https://www.jimmunol.org/content/162/6/3647, Mar. 15, 1999, 7 pages.

Yoon, Kyongii et al., "Event Detection from MPEG Video in the Compressed Domain", Jan. 2000, 7 pages.

Zelnik-Manor, Lihi et al., "Event-Based Analysis of Video", Feb. 2001, 18 pages.

Zhou, F , "Aligned Cluster Analysis for Temporal Segmentation of Human Motion", Oct. 2008, 7 pages.

"Final Office Action", U.S. Appl. No. 17/659,718, filed Mar. 6, 2024, 10 pages.

"International Preliminary Report on Patentability", Application No. PCT/US2022/074367, Feb. 6, 2024, 9 pages.

"Foreign Office Action", EP Application No. 18732516.2, Feb. 27, 2023, 6 pages.

"Notice of Allowance", U.S. Appl. No. 17/651,781, filed Mar. 8, 2023, 9 pages.

"Notice of Allowance", U.S. Appl. No. 17/805,713, filed May 17, 2023, 8 pages.

Zuo, et al., "Real-time Embedded Face Recognition for Smart Home", IEEE Transactions on Consumer Electronics (vol. 51, Issue: 1), Feb. 1, 2005, pp. 183-190.

"Final Office Action", U.S. Appl. No. 17/651,772, filed Jan. 5, 2024, 24 pages.

"Non-Final Office Action", U.S. Appl. No. 17/659,718, filed Nov. 20, 2023, 10 pages.

Birnstill, et al., "Enforcing Privacy through Usage-Controlled Video Surveillance", Aug. 2013, 6 pages.

"Non-Final Office Action", U.S. Appl. No. 17/651,772, Aug. 2, 2023, 17 pages.

"Non-Final Office Action", U.S. Appl. No. 17/659,718, May 22, 2024, 9 pages.

"Notice of Allowance", U.S. Appl. No. 18/327,468, Jun. 18, 2024, 8 pages.

"Foreign Office Action", EP Application No. 22761871.7, Nov. 26, 2025, 11 pages.

"Non-Final Office Action", U.S. Appl. No. 18/462,986, Sep. 18, 2025, 11 pages.

"Notice of Allowance", U.S. Appl. No. 18/170,919, Oct. 1, 2025, 5 pages.

"Notice of Allowance", U.S. Appl. No. 18/462,986, Feb. 26, 2026, 7 pages.

"Foreign Office Action", CN Application No. 202280042845.X, Mar. 28, 2026, 17 pages.

* cited by examiner

Figure 1A:
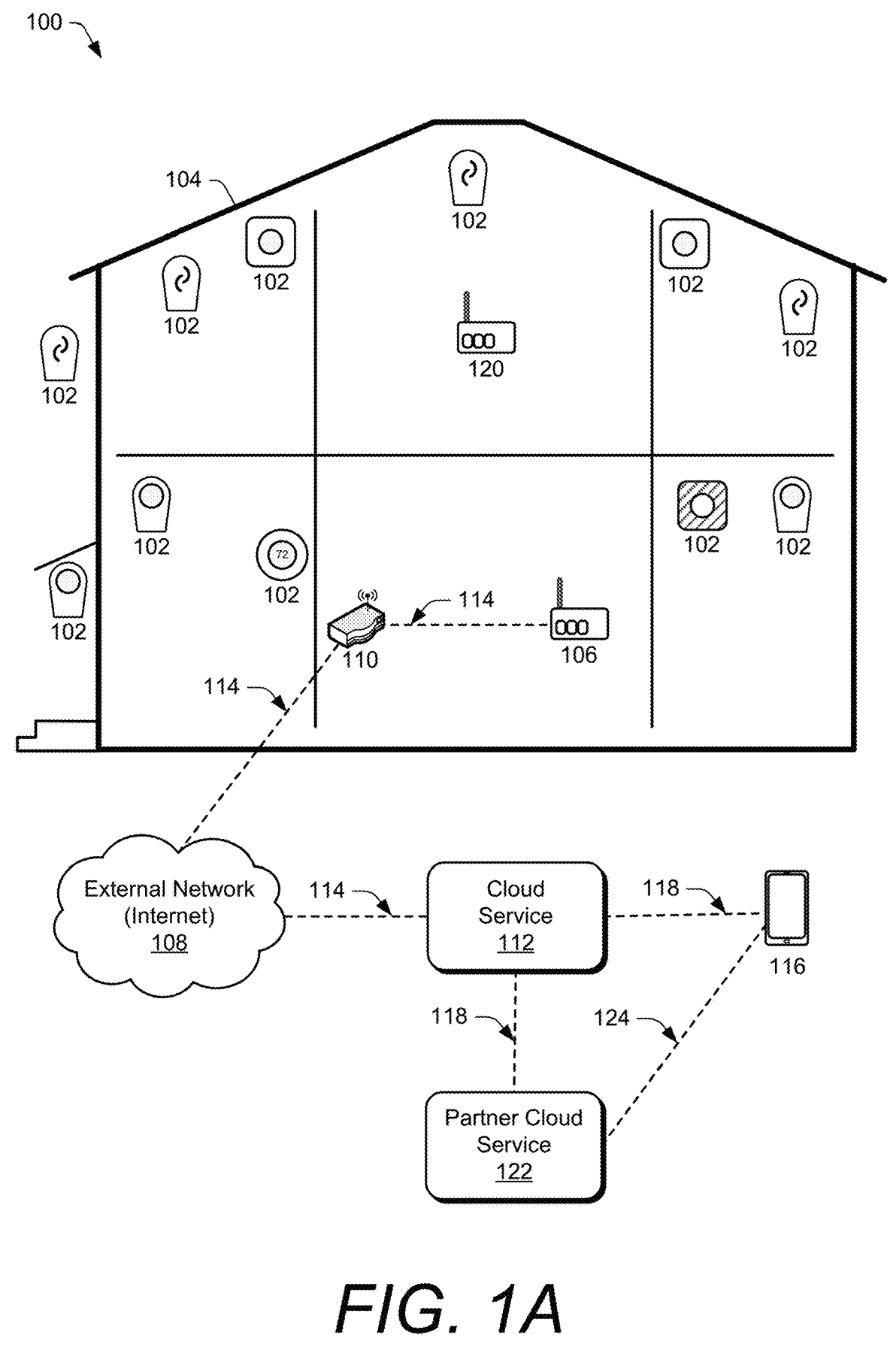

100

104

102
102
102
102
102
120
102
102
102
102
102
102
114
110
106
114

External Network (Internet) 108

114

Cloud Service 112

118

116

118

124

Partner Cloud Service 122

HVAC

144

156

Pool Heater

158

External Network
(Internet)

108

Cloud
Service

112

Irrigation System

160

Network Architecture 200 ⟶

220

Server-Side Module
232

Video Storage Database 236

Processor(s) 234

Account Database 238

Server System 206

I/O Interface to Client(s) 240

I/O Interface to Video Source(s) 242

Network(s) 108

Client-Side Module 230-1

228-1

246-t 246-1
246-2

224-1

224-2

226-2

222-1

244-q
244-2
244-1

Client-Side Module 230-m

228-p 222-n 224-m 226-2

224-z

Server System
206

Memory 306

Processor(s)
302

308

Network
Interface(s)
304

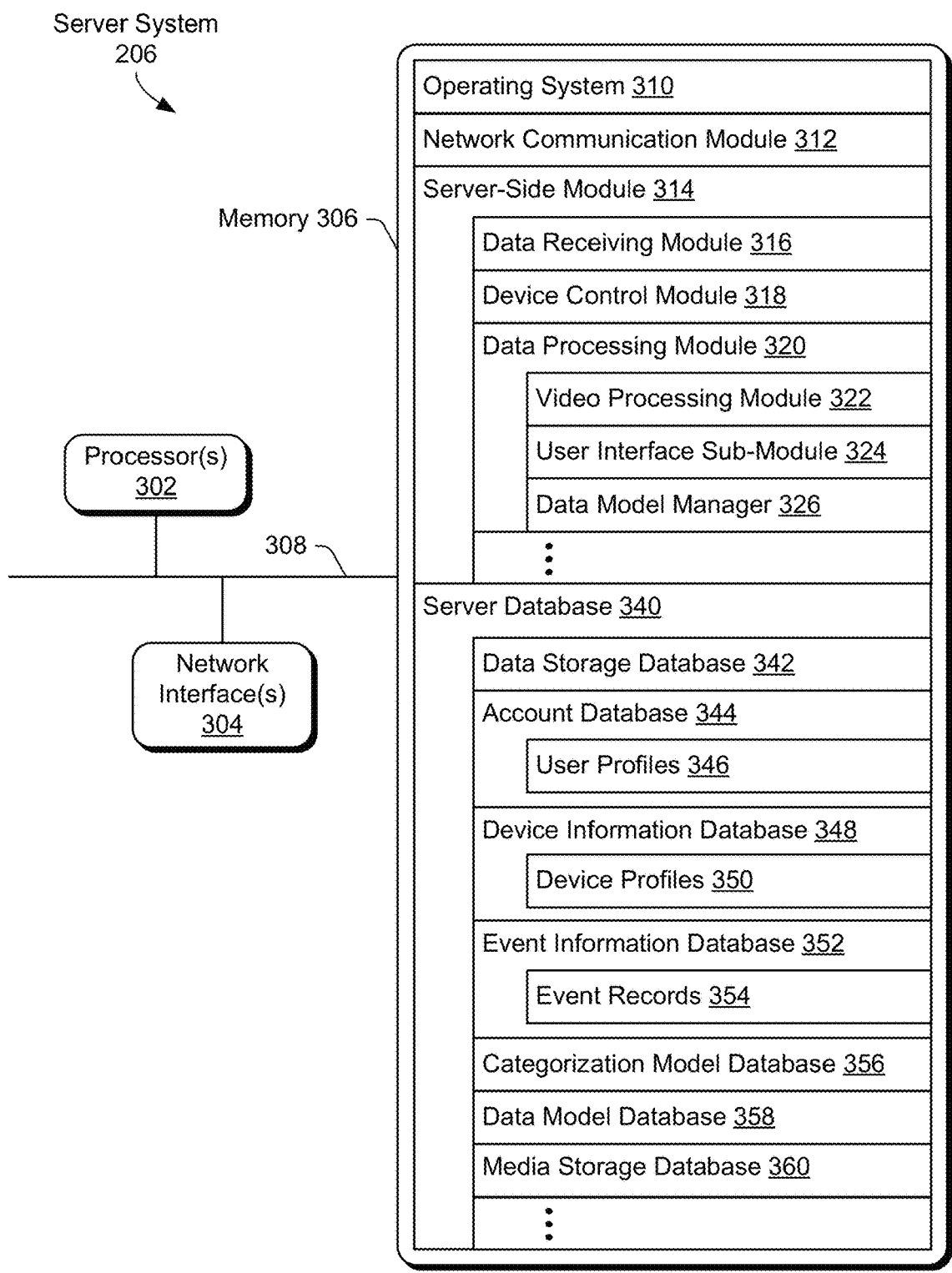

Operating System 310

Network Communication Module 312

Server-Side Module 314

Data Receiving Module 316

Device Control Module 318

Data Processing Module 320

Video Processing Module 322

User Interface Sub-Module 324

Data Model Manager 326

Server Database 340

Data Storage Database 342

Account Database 344

User Profiles 346

Device Information Database 348

Device Profiles 350

Event Information Database 352

Event Records 354

Categorization Model Database 356

Data Model Database 358

Media Storage Database 360

*FIG. 3*

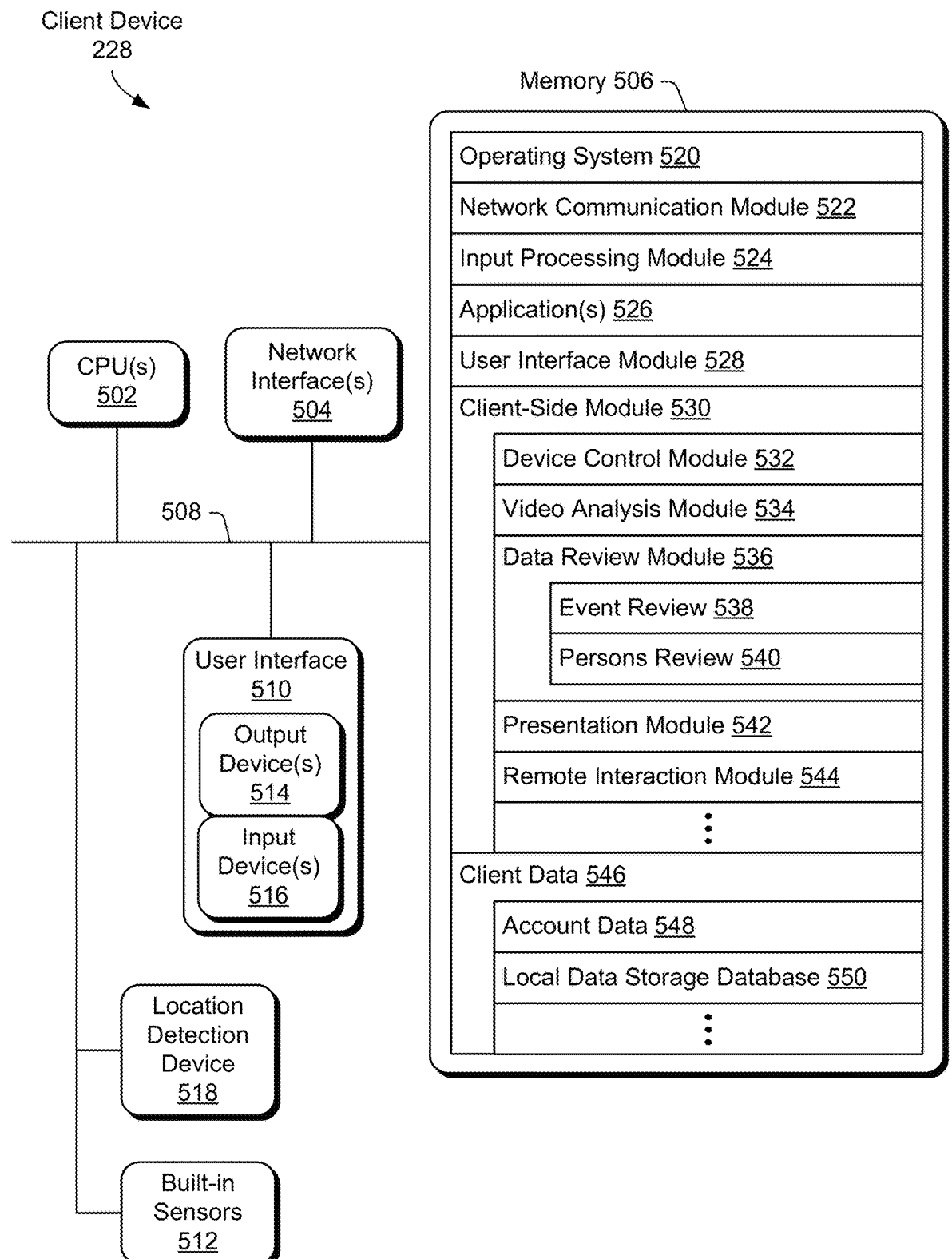

Client Device
228

Memory 506

Operating System 520

Network Communication Module 522

Input Processing Module 524

Application(s) 526

User Interface Module 528

Client-Side Module 530

Device Control Module 532

Video Analysis Module 534

Data Review Module 536

Event Review 538

Persons Review 540

Presentation Module 542

Remote Interaction Module 544

Client Data 546

Account Data 548

Local Data Storage Database 550

CPU(s)
502

Network
Interface(s)
504

508

User Interface
510

Output
Device(s)
514

Input
Device(s)
516

Location
Detection
Device
518

Built-in
Sensors
512

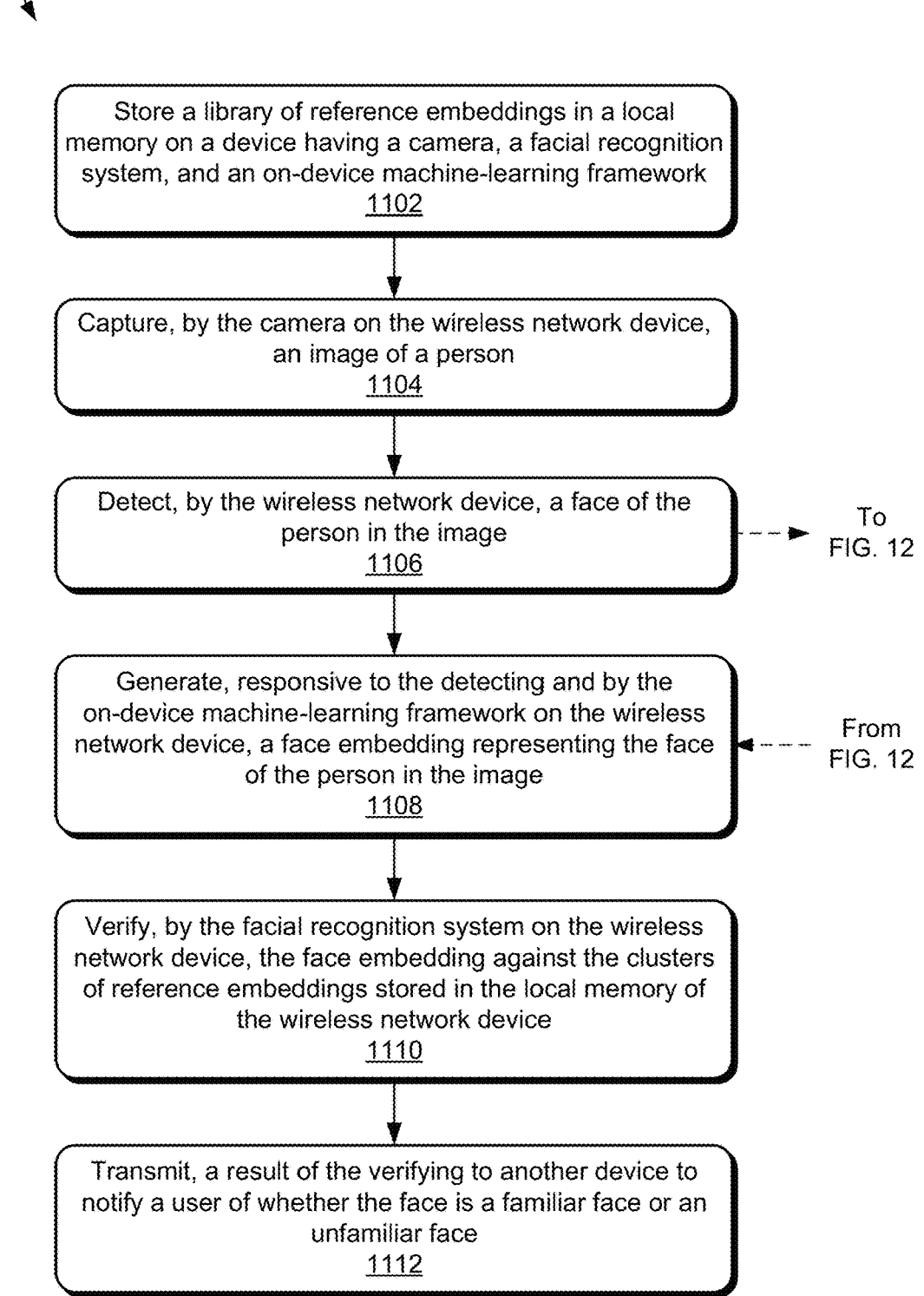

Store a library of reference embeddings in a local memory on a device having a camera, a facial recognition system, and an on-device machine-learning framework
1102

Capture, by the camera on the wireless network device, an image of a person
1104

Detect, by the wireless network device, a face of the person in the image
1106

- - → To FIG. 12

Generate, responsive to the detecting and by the on-device machine-learning framework on the wireless network device, a face embedding representing the face of the person in the image
1108

← - - From FIG. 12

Verify, by the facial recognition system on the wireless network device, the face embedding against the clusters of reference embeddings stored in the local memory of the wireless network device
1110

Transmit, a result of the verifying to another device to notify a user of whether the face is a familiar face or an unfamiliar face
1112

*FIG. 11*

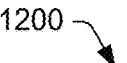
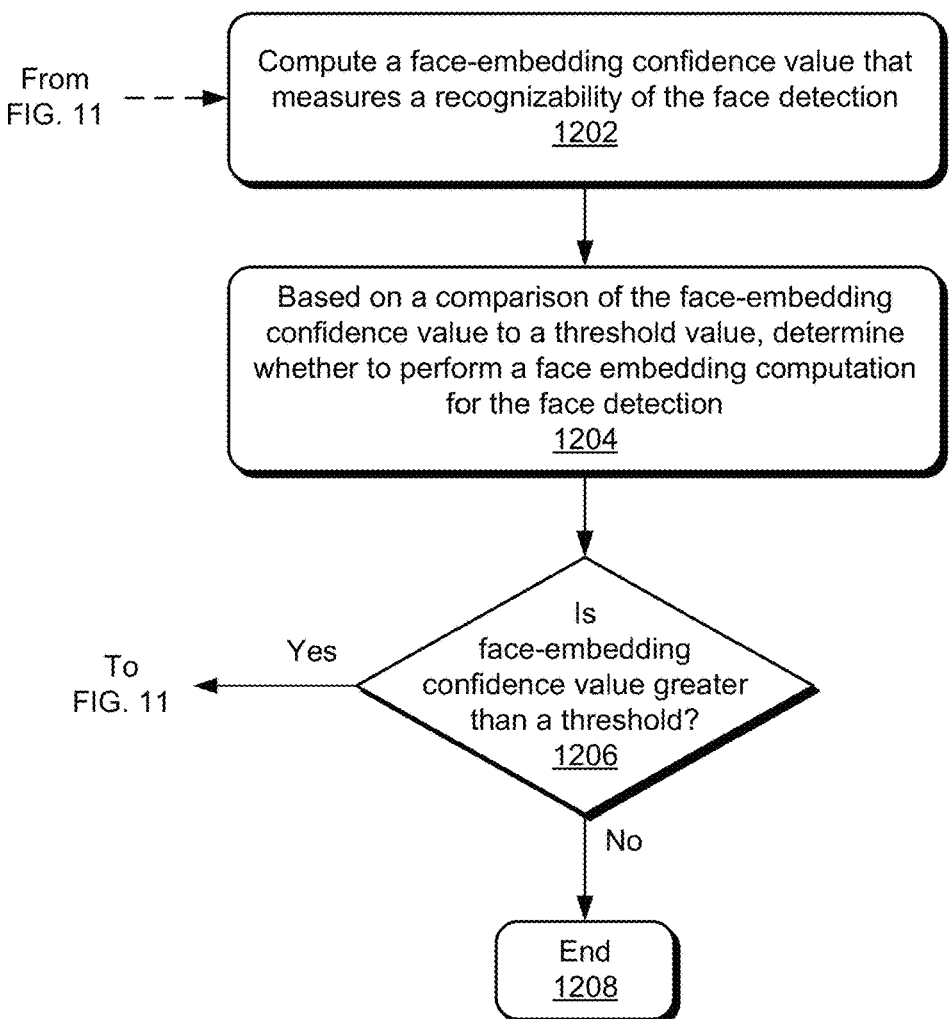
*FIG. 12*

1300

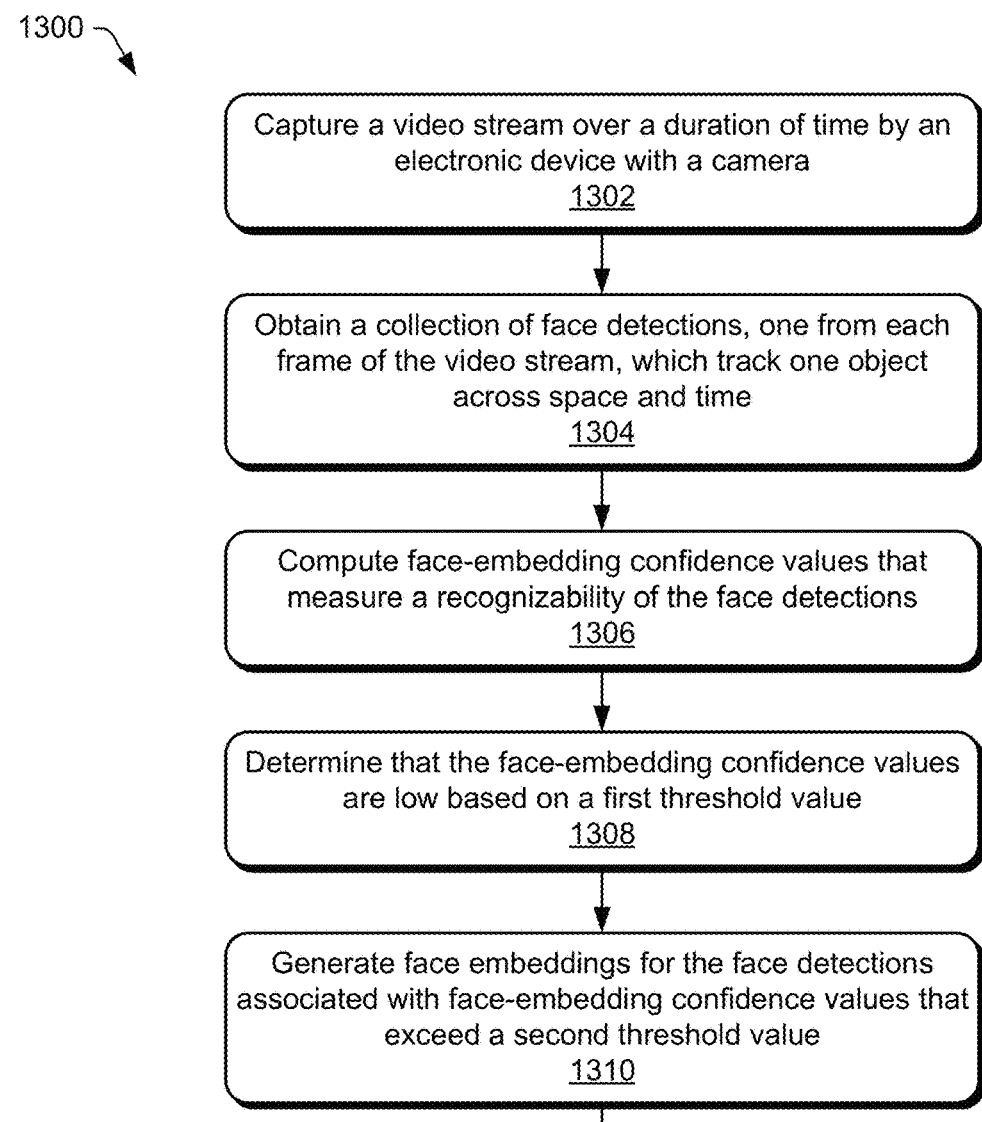

Capture a video stream over a duration of time by an electronic device with a camera
1302

Obtain a collection of face detections, one from each frame of the video stream, which track one object across space and time
1304

Compute face-embedding confidence values that measure a recognizability of the face detections
1306

Determine that the face-embedding confidence values are low based on a first threshold value
1308

Generate face embeddings for the face detections associated with face-embedding confidence values that exceed a second threshold value
1310

Infer an identity for each face detection based on a comparison of each face embedding with clusters of face embeddings stored in a local memory of the electronic device
1312

Based on a determination that a sufficient number of the face detections are in consensus with one another on the inferred identity, commit to the inferred identity and notifying a user of the electronic device
1314

FIG. 13

SYSTEMS AND METHODS FOR ON-DEVICE PERSON RECOGNITION AND PROVISION OF INTELLIGENT ALERTS

RELATED APPLICATION(S)

This application is a national stage entry of International Application No. PCT/US2022/074367, filed Aug. 1, 2022, which claims the benefit of U.S. Provisional Application No. 63/228,556, filed Aug. 2, 2021, the disclosures of which are incorporated herein by reference in their entirety.

BACKGROUND

In many conventional video surveillance systems for person recognition, the recognition occurs on a device (e.g., server) separate from the video surveillance device (e.g., camera) and potentially in a separate geographical location. A cloud service, for example, provides additional storage and computing capacity for machine learning associated with person recognition, whereas many client devices lack such storage and computing capacity. The cloud service, therefore, generally acts as a hub to manage person recognition tasks of the video surveillance system. Some conventional client devices may compute some biometrics. However, sending raw images and/or a raw video stream out of the device (for the purpose of person recognition) raises privacy concerns. Further, some devices may not have on-device encryption and therefore may transmit unencrypted sensitive data.

Many challenges arise with running person recognition logic on the camera of the video surveillance system. For example, the cameras of the system have limited storage and computational capacity compared to the cloud. Also, a single-camera surveillance system may lose all its data if the camera breaks. In another example, a multi-camera surveillance system may have different devices with different computational power, which prevents all the devices from running the same facial recognition model. Further, the different devices may have different storage capacities, preventing at least some of the devices from storing thousands of images (for the facial recognition model). Additional challenges and privacy concerns arise with synchronizing one device's person recognition data with another device of the system. Accordingly, although on-device person recognition may have improved privacy compared to that of conventional cloud-based person-recognition systems, the on-device person recognition has many challenges that can result in a non-complementary system vulnerable to data loss, poor efficiency, poor accuracy, and/or a poor user experience.

SUMMARY

The present document describes systems and methods for on-device person recognition and provision of intelligent alerts. The system includes a decentralized multi-camera system for on-device facial recognition. A device (e.g., security camera, video doorbell) captures images/video of a person, processes input image frames, detects face images, filters static faces, and aligns a rotation of the face to be upright and frontal. The device then filters low-quality face images and/or images having a large portion of the face occluded. The device computes a face embedding, compares it against a set of locally stored reference embeddings, and sends matching results to cloud services, which, based on the matching result, notifies the device owner whether the observed person is a known person or a stranger. Face detection and recognition computations are performed on-device, not at the cloud. No sensitive information is transmitted off device and privacy is therefore preserved.

In aspects, a method for on-device facial recognition is disclosed. The method includes storing a library of reference embeddings in a local memory on a wireless network device having a camera, a facial recognition system, and an on-device machine-learning framework. In implementations, the reference embeddings are grouped in clusters. The method also includes capturing, by the camera on the wireless network device, an image of a person. Further, the method includes detecting, by the wireless network device, a face of the person in the image to provide a face detection. In addition, the method includes generating, responsive to the detecting and by the on-device machine-learning framework on the wireless network device, a face embedding representing the face of the person in the image. Also, the method includes verifying, by the facial recognition system on the wireless network device, the face embedding against the clusters stored in the local memory of the wireless network device. The method further includes transmitting a result of the verifying to another device to notify a user of whether the face is a familiar face or an unfamiliar face.

In other aspects, an electronic device is disclosed. The electronic device includes a camera configured to capture images or video of a scene, one or more processors, and local memory. The local memory stores a local library of reference embeddings organized into clusters, each cluster having a subset of the reference embeddings and being associated with a human face. The local library also stores executable instructions that, when executed by the one or more processors, cause the one or more processors to perform the above method.

This summary is provided to introduce simplified concepts of on-device person recognition and provision of intelligent alerts, which are further described below in the Detailed Description. This summary is not intended to identify essential features of the claimed subject matter, nor is it intended for use in determining the scope of the claimed subject matter.

BRIEF DESCRIPTION OF THE DRAWINGS

The details of one or more aspects of on-device person recognition and provision of intelligent alerts are described in this document with reference to the following drawings. The same numbers are used throughout the drawings to reference like features and components:

FIG. 1A is an example network environment in which various aspects of on-device person recognition and provision of intelligent alerts can be implemented;

FIG. 3 is a block diagram illustrating the server system in accordance with some implementations;

FIG. 5 is a block diagram illustrating a representative client device associated with a user account in accordance with some implementations;

FIG. 10 illustrates an example implementation of the on-device facial recognition system of FIG. 6 according to a scenario in which the device is uncertain whether to match the face to a cluster or reject it completely;

FIG. 11 depicts a method for on-device person recognition and provision of intelligent alerts;

FIG. 12 depicts a method that is optionally performed in conjunction with the method in FIG. 11 for filtering low-quality faces; and FIG. 13 depicts a method for on-device person recognition in a video stream in accordance with one or more implementations.

DETAILED DESCRIPTION

Figure 1B:
FIG. 1B illustrates the example environment from FIG. 1 in more detail.

The present document describes systems and methods for on-device person recognition and provision of intelligent alerts. Generally, a video surveillance system, upon observing a person in a field of view of one of the system's cameras, transmits a notification (e.g., alert) to a structure manager (e.g., user of the system) that the system detects a person. The notification may include information corresponding to a name and/or location of the particular camera observing the person. The camera performs on-device person recognition to determine if the person is known or unknown. In one example, if the person is recognized by the camera as a known person, the camera responsively transmits a notification to the structure manager (e.g., user) that the camera detected and recognized a familiar person. In another example, if the camera becomes confident that the person is not a known person, the camera transmits a notification to the structure manager to indicate that the camera has detected an unfamiliar person and to ask the structure manager if they know the detected person. In response, the structure manager can (i) confirm they know the person and assign a name to the person, (ii) confirm they do not know the person, or (iii) confirm that the detected person is not a real human face. In the case of (i), the name can then be used in the system user interface and future notifications. In the case of (ii), any data of the detected person is removed from the system, resulting in future detections of that person triggering an unfamiliar person notification. In the case of (iii), the data is marked as not a human face in the library and any future match to this data is suppressed.

In some implementations, a user interface (e.g., a mobile app, a desktop application, a web application) is provided to the structure manager. The user interface provides access for the structure manager to view the stored images in the library. A user input, provided by the structure manager via this user interface, can be used to perform one or more operations including, for example, removing an exemplar (e.g., relevant data from a single encounter of a human by a camera in the system) from the library, removing a person (and all of its associated data) from the library, deleting all the data in the library, merging two or more people (and their corresponding clusters) in the library, and/or moving an exemplar for person A to person B in the library.

The system includes various elements, many of which are described below. For example, a camera, as described herein is a video surveillance device or monitoring device that has an image sensor. A structure, as described herein, is a combination of information for a single video surveillance system, which may include a single household with multiple cameras.

Face detection is a portion of an image that contains a face (e.g., a human face). A face snapshot is a cropped version of an image based on face detection information. An example snapshot is a cropped headshot. A face track is a collection of face detections, one from each frame of a series of frames (e.g., video clip), which tracks one object (e.g., a face) across space and time.

An exemplar includes relevant data from a single encounter of a human, by the device or another device in the system, that is used for recognizing the same person or other people. The exemplar (stored at the device) may include metadata information about the human, the face embedding, a quality score of the face embedding. Exemplar information includes the metadata associated with the exemplar and may include an exemplar identifier, an identifier for a corresponding face snapshot, and a corresponding cluster identifier (cluster ID). In some implementations, the exemplar information may include a time (e.g., timestamp) indicating when the associated image was captured. Exemplar information that is transmitted to another device does not include sensitive information such as face embeddings. A reference exemplar is generated by an off-device service (e.g., the cloud) based on the exemplar information (received from the device) and includes the metadata information and the quality score but does not include the face embedding.

A cluster is a set of exemplars that are assumed by the system to belong to the same person. The term "human" (as in human library) is a set of clusters that are assigned to the same person. In addition to exemplars, each human also has an identifier (ID), a category, and may have an associated name given by the structure manager. A human library is a set of all humans in the structure. A local human library is a copy or subset of the human library and is stored on a computer-readable storage medium of a single device. An in-memory human library is a human library that is used locally for identification by the device and is stored in Random Access Memory (RAM). The in-memory human library stored in RAM can be different from the local human library stored on the computer-readable medium of the device. A human name (in the human library) is a name associated by the structure manager to a human in the human library. The human name is used in the system user interface or in notifications (e.g., alert messages) to the structure manager. A human category is a category for each human in the human library. Example categories include "familiar" and "unfamiliar."

Off-device services are services external to the device. Off-device services may include a cloud service for sending updates, image(s), and video streams from a device to the cloud and for downloading a copy or subset of the human library from the cloud. A media storage service is an off-device service for storage of image and video history. Another off-device service is a data model manager (DMM) for storage of metadata information of a structure and its library. Off-device services may also include a reference library (also referred to as a reference human library), which stores a complete version of the human library, including images captured by all the devices in the structure. A discovered exemplar is an exemplar for a face detected by the device, but which has not yet been added to the reference library.

A face embedding is a multi-dimensional series of values computed from a face detection using a mathematical process and forms the "biometric imprint" of the face. Embeddings have a property in which embeddings generated from the same face are closer in distance than embeddings generated from different faces. Person embeddings are similar to face embeddings but are computed from a person detection (e.g., body). A face-embedding confidence is a single value in a range of [0, 1] that signifies the quality of a face embedding generated from a face snapshot if used for recognition tasks.

To preserve privacy, face or person embeddings are not shared off-device. In an example, the face image may be shared out of the device to be viewed by the structure manager in the system user interface. The face image may also be shared with other local devices in the same system. However, the embeddings, including any biometric data, computed by a device in the structure may include biometric data. Thus, embeddings are stored locally and securely on that device and are not transmitted to any other device.

Accordingly, the facial recognition system described herein runs fully on the camera device, rather than in the cloud, which preserves privacy. The camera device notifies the device owner through a cloud service. This system can be used with multiple cameras. Different cameras in the system can synchronize images to learn what the other cameras observe, and each camera performs its own facial recognition on the shared image, creating and storing its own face embedding for the shared image. Also described herein is an indicator for usability of face images in facial recognition systems based on the L2-Norm of the face embedding (the L2-Norm calculates the distance of the vector coordinate from the origin of the vector space and, as such, is known as the Euclidean norm because it is calculated as the Euclidean distance from the origin). This indicator is used to filter low quality or false positive face detections that are not reliable for person recognition. Also described herein is an approach for identifying a person from low-quality face detections in a video stream, based on a consensus of inferred identity after matching these detections to a reference library of face embeddings. To preserve space in memory, the device discards the image after performing the facial recognition on the shared image but maintains the facial recognition data (e.g., exemplar).

Thus, computing systems and devices are provided with more-efficient methods for increased privacy. These disclosed systems and devices also increase the effectiveness and accuracy of face detection and recognition of low-quality images or false-positive face detections, which may enhance the user experience and satisfaction. While features and concepts of the described techniques for on-device person recognition and provision of intelligent alerts can be implemented in any number of different environments, aspects are described in the context of the following examples.

Example Device

FIG. 1A illustrates an example network environment 100 (e.g., network environment) in which various aspects of on-device person recognition and provision of intelligent alerts can be implemented. The network environment 100 includes a home area network (HAN). The HAN includes wireless network devices 102 (e.g., electronic devices) that are disposed about a structure 104, such as a house, and are connected by one or more wireless and/or wired network technologies, as described below. The HAN includes a border router 106 that connects the HAN to an external network 108, such as the Internet, through a home router or access point 110.

To provide user access to functions implemented using the wireless network devices 102 in the HAN, a cloud service 112 connects to the HAN via a border router 106, via a secure tunnel 114 through the external network 108 and the access point 110. The cloud service 112 facilitates communication between the HAN and internet clients 116, such as apps on mobile devices, using a web-based application programming interface (API) 118. The cloud service 112 also manages a home graph that describes connections and relationships between the wireless network devices 102, elements of the structure 104, and users. The cloud service 112 hosts controllers which orchestrate and arbitrate home automation experiences, as described in greater detail below.

The HAN may include one or more wireless network devices 102 that function as a hub 120. The hub 120 may be a general-purpose home automation hub, or an application-specific hub, such as a security hub, an energy-management hub, a heating, ventilation, and air conditioning (HVAC) hub, and so forth. The functionality of a hub 120 may also be integrated into any wireless network device 102, such as a smart thermostat device or the border router 106. In addition to hosting controllers on the cloud service 112, controllers can be hosted on any hub 120 in the structure 104, such as the border router 106. A controller hosted on the cloud service 112 can be moved dynamically to the hub 120 in the structure 104, such as moving an HVAC zone controller to a newly installed smart thermostat.

Hosting functionality on the hub 120 in the structure 104 can improve reliability when the user's internet connection is unreliable, can reduce latency of operations that would normally have to connect to the cloud service 112, and can satisfy system and regulatory constraints around local access between wireless network devices 102.

The wireless network devices 102 in the HAN may be from a single manufacturer that provides the cloud service 112 as well, or the HAN may include wireless network devices 102 from partners. These partners may also provide partner cloud services 122 that provide services related to their wireless network devices 102 through a partner Web API 124. The partner cloud service 122 may optionally or additionally provide services to internet clients 116 via the web-based API 118, the cloud service 112, and the secure tunnel 114.

The network environment 100 can be implemented on a variety of hosts, such as battery-powered microcontroller-based devices, line-powered devices, and servers that host cloud services. Protocols operating in the wireless network devices 102 and the cloud service 112 provide a number of services that support operations of home automation experiences in the distributed computing environment 100. These services include, but are not limited to, real-time distributed data management and subscriptions, command-and-response control, real-time event notification, historical data logging and preservation, cryptographically controlled security groups, time synchronization, network and service pairing, and software updates. FIG. 1B illustrates an example environment 130 in which a home area network, as described with reference to FIG. 1A, and aspects of on-device person recognition and provision of intelligent alerts can be implemented. Generally, the environment 130 includes the home area network (HAN) implemented as part of a home or other type of structure with any number of wireless network devices (e.g., wireless network devices 102) that are configured for communication in a wireless network. For example, the wireless network devices can include a thermostat 132, hazard detectors 134 (e.g., for smoke and/or carbon monoxide), cameras 136 (e.g., indoor and outdoor), lighting units 138 (e.g., indoor and outdoor), and any other types of wireless network devices 140 that are implemented inside and/or outside of a structure 142 (e.g., in a home environment). In this example, the wireless network devices can also include any of the previously described devices, such as a border router 106, as well as the wireless network device 102.

In the environment 130, any number of the wireless network devices can be implemented for wireless interconnection to wirelessly communicate and interact with each other. The wireless network devices are modular, intelligent, multi-sensing, network-connected devices that can integrate seamlessly with each other and/or with a central server or a cloud-computing system to provide any of a variety of useful automation objectives and implementations. An example of a wireless network device that can be implemented as any of the devices described herein is shown and described with reference to FIG. 4.

In implementations, the thermostat 132 may include a Nest® Learning Thermostat that detects ambient climate characteristics (e.g., temperature and/or humidity) and controls an HVAC system 144 in the home environment. The learning thermostat 132 and other network-connected devices "learn" by capturing occupant settings to the devices. For example, the thermostat learns preferred temperature set points for mornings and evenings when the occupants of the structure are asleep or awake, as well as when the occupants are typically away or at home.

A hazard detector 134 can be implemented to detect the presence of a hazardous substance or a substance indicative of a hazardous substance (e.g., smoke, fire, or carbon monoxide). In examples of wireless interconnection, a hazard detector 134 may detect the presence of smoke, indicating a fire in the structure, in which case the hazard detector that first detects the smoke can broadcast a low-power wake-up signal to all of the connected wireless network devices. The other hazard detectors 134 can then receive the broadcast wake-up signal and initiate a high-power state for hazard detection and to receive wireless communications of alert messages. Further, the lighting units 138 can receive the broadcast wake-up signal and activate in the region of the detected hazard to illuminate and identify the problem area. In another example, the lighting units 138 may activate in one illumination color to indicate a problem area or region in the structure, such as for a detected fire or break-in, and activate in a different illumination color to indicate safe regions and/or escape routes out of the structure.

In various configurations, the wireless network devices 140 can include an entryway interface device 146 that functions in coordination with a network-connected door lock system 148, and that detects and responds to a person's approach to or departure from a location, such as an outer door of the structure 142. The entryway interface device 146 can interact with the other wireless network devices based on whether someone has approached or entered the smart-home environment. An entryway interface device 146 can control doorbell functionality, announce the approach or departure of a person via audio or visual means, and control settings on a security system, such as to activate or deactivate the security system when occupants come and go. The wireless network devices 140 can also include other sensors and detectors, such as to detect ambient lighting conditions, detect room-occupancy states (e.g., with an occupancy sensor 150), and control a power and/or dim state of one or more lights. In some instances, the sensors and/or detectors may also control a power state or speed of a fan, such as a ceiling fan 152. Further, the sensors and/or detectors may detect occupancy in a room or enclosure and control the supply of power to electrical outlets or devices 154, such as if a room or the structure is unoccupied.

The wireless network devices 140 may also include connected appliances and/or controlled systems 156, such as refrigerators, stoves and ovens, washers, dryers, air conditioners, pool heaters 158, irrigation systems 160, security systems 162, and so forth, as well as other electronic and computing devices, such as televisions, entertainment systems, computers, intercom systems, garage-door openers 164, ceiling fans 152, control panels 166, and the like. When plugged in, an appliance, device, or system can announce itself to the home area network as described above and can be automatically integrated with the controls and devices of the home area network, such as in the home. It should be noted that the wireless network devices 140 may include devices physically located outside of the structure, but within wireless communication range, such as a device controlling a swimming pool heater 158 or an irrigation system 160.

As described above, the HAN includes a border router 106 that interfaces for communication with an external network, outside the HAN. The border router 106 connects to an access point 110, which connects to the external network 108, such as the Internet. A cloud service 112, which is connected via the external network 108, provides services related to and/or using the devices within the HAN. By way of example, the cloud service 112 can include applications for connecting end-user devices 168, such as smartphones, tablets, and the like, to devices in the home area network, processing and presenting data acquired in the HAN to end-users, linking devices in one or more HANs to user accounts of the cloud service 112, provisioning and updating devices in the HAN, and so forth. For example, a user can control the thermostat 132 and other wireless network devices in the home environment using a network-connected computer or portable device, such as a mobile phone or tablet device. Further, the wireless network devices can communicate information to any central server or cloud-computing system via the border router 106 and the access point 110. The data communications can be carried out using any of a variety of custom or standard wireless protocols (e.g., Wi-Fi, ZigBee for low power, 6LoWPAN, Thread, etc.) and/or by using any of a variety of custom or standard wired protocols (CAT6 Ethernet, HomePlug, and so on).

Any of the wireless network devices in the HAN can serve as low-power and communication nodes to create the HAN in the home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the home area network. The wireless network devices can be implemented to conserve power, particularly when battery-powered, utilizing low-powered communication protocols to receive the messages, translate the messages to other communication protocols, and send the translated messages to other nodes and/or to a central server or cloud-computing system. For example, the occupancy sensor 150 and/or an ambient light sensor 170 can detect an occupant in a room as well as measure the ambient light, and activate the light source when the ambient light sensor 170 detects that the room is dark and when the occupancy sensor 150 detects that someone is in the room. Further, the sensor can include a low-power wireless communication chip (e.g., an IEEE 802.15.4 chip, a Thread chip, a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the home area network, from node to node (i.e., network-connected device to network-connected device) within the home environment as well as over the Internet to a central server or cloud-computing system.

In other configurations, various ones of the wireless network devices can function as "tripwires" for an alarm system in the home environment. For example, in the event that a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the home area network. In other implementations, the home area network can be used to automatically turn on and off the lighting units 138 as a person transitions from room to room in the structure. For example, the wireless network devices can detect the person's movement through the structure and communicate corresponding messages via the nodes of the home area network. Using the messages that indicate which rooms are occupied, other wireless network devices that receive the messages can activate and/or deactivate accordingly. As referred to above, the home area network can also be utilized to provide exit lighting in the event of an emergency, such as by turning on the appropriate lighting units 138 that lead to a safe exit. The light units 138 may also be turned on to indicate the direction along an exit route that a person should travel to safely exit the structure.

The various wireless network devices may also be implemented to integrate and communicate with wearable computing devices 172, such as may be used to identify and locate an occupant of the structure and adjust the temperature, lighting, sound system, and the like accordingly. In other implementations, radio frequency identification (RFID) sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques may draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other wireless network devices and sensors in the environment according to rules-based inferencing techniques or artificial intelligence techniques for achieving better performance of these functionalities. In an example relating to a personal health area, the system can detect whether a household pet is moving toward the current location of an occupant (e.g., using any of the wireless network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the home area network, conforming to the wireless interconnection protocols for communicating on the home area network.

The wireless network devices 140 may also include a network-connected alarm clock 174 for each of the individual occupants of the structure in the home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the home area network based on a unique signature of the person, which is determined based on data obtained from sensors located in the wireless network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 132 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other wireless network devices can use the data to provide other automation objectives, such as adjusting the thermostat 132 so as to pre-heat or cool the environment to a desired setting and turning on or turning off the lighting units 138.

In implementations, the wireless network devices can also be utilized for sound, vibration, and/or motion sensing such as to detect running water and determine inferences about water usage in a home environment based on algorithms and mapping of the water usage and consumption. This can be used to determine a signature or fingerprint of each water source in the home and is also referred to as "audio fingerprinting water usage." Similarly, the wireless network devices can be utilized to detect the subtle sound, vibration, and/or motion of unwanted pests, such as mice and other rodents, as well as termites, cockroaches, and other insects. The system can then notify an occupant of the suspected pests in the environment, such as with warning messages to help facilitate early detection and prevention.

The environment 130 may include one or more wireless network devices that function as a hub 176. The hub 176 (e.g., hub 120) may be a general-purpose home automation hub, or an application-specific hub, such as a security hub, an energy management hub, an HVAC hub, and so forth. The functionality of a hub 176 may also be integrated into any wireless network device, such as a network-connected thermostat device or the border router 106. Hosting functionality on the hub 176 in the structure 142 can improve reliability when the user's internet connection is unreliable, can reduce latency of operations that would normally have to connect to the cloud service 112, and can satisfy system and regulatory constraints around local access between wireless network devices.

Additionally, the example environment 130 includes a network-connected speaker 178. The network-connected speaker 178 provides voice assistant services that include providing voice control of network-connected devices. The functions of the hub 176 may be hosted in the network-connected speaker 178. The network-connected speaker 178 can be configured to communicate via the HAN, which may include a wireless mesh network, a Wi-Fi network, or both.

Figure 2A:
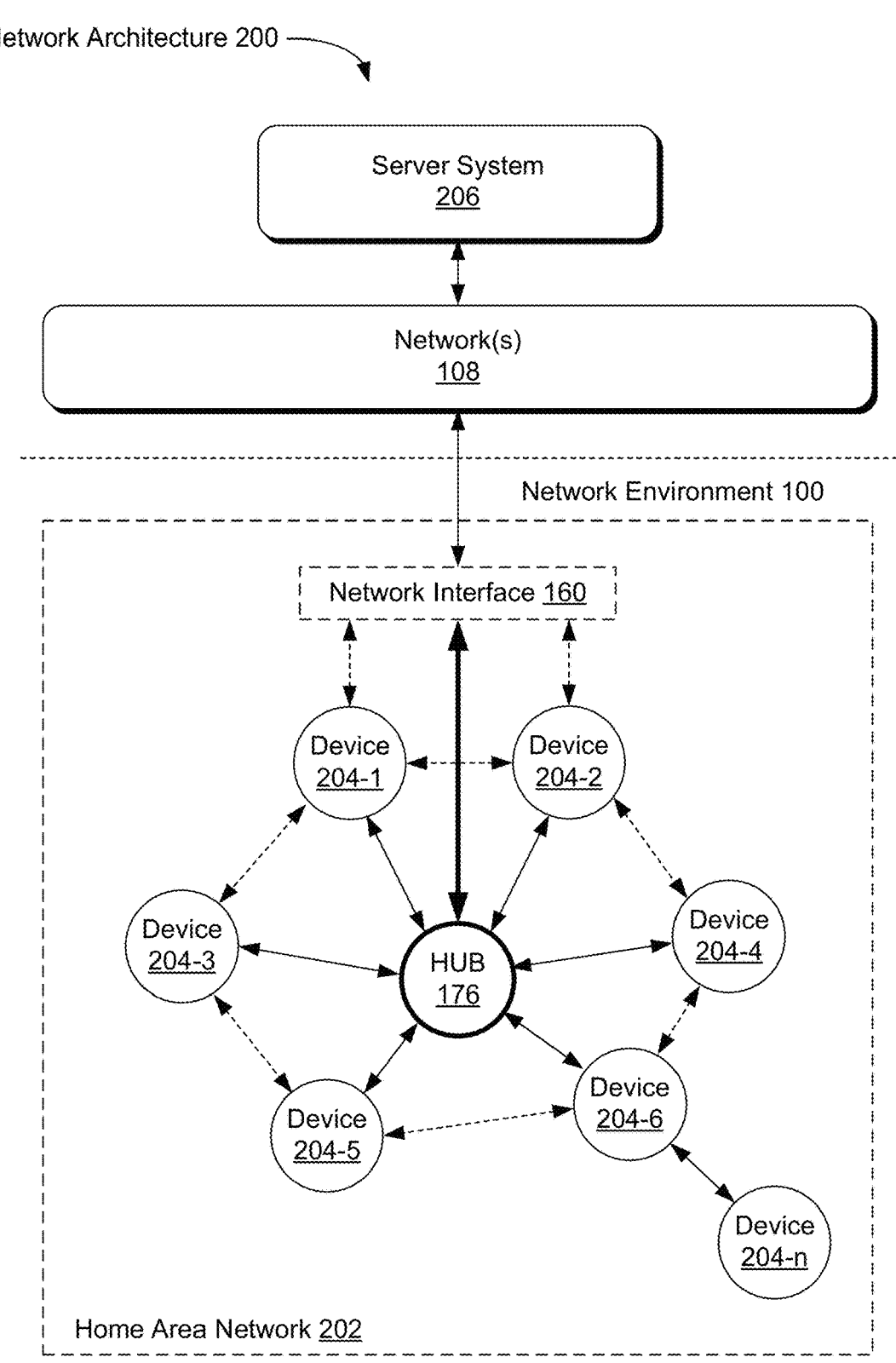
FIG. 2A is a block diagram illustrating a representative network architecture that includes a home area network in accordance with some implementations.

FIG. 2A is a block diagram illustrating a representative network architecture 200 that includes a home area network 202 (HAN 202) in accordance with some implementations. In some implementations, smart devices 204 (e.g., wireless network devices 102) in the network environment 100 combine with the hub 176 to create a mesh network in the HAN 202. In some implementations, one or more of the smart devices 204 in the HAN 202 operate as a smart home controller. Additionally and/or alternatively, the hub 176 may operate as the smart home controller. In some implementations, a smart home controller has more computing power than other smart devices. The smart home controller can process inputs (e.g., from smart devices 204, end-user devices 168, and/or server system 206) and send commands (e.g., to smart devices 204 in the HAN 202) to control operation of the network environment 100. In aspects, some of the smart devices 204 in the HAN 202 (e.g., in the mesh network) are "spokesman" nodes (e.g., 204 1, 204-2) and others are "low-powered" nodes (e.g., 204-n). Some of the smart devices in the network environment 100 may be battery-powered, while others may have a regular and reliable power source, such as via line power (e.g., to 120V line voltage wires). The smart devices that have a regular and reliable power source are referred to as "spokesman" nodes. These nodes are typically equipped with the capability of using a wireless protocol to facilitate bidirectional communication with a variety of other devices in the network environment 100, as well as with the server system 206 (e.g., cloud service 112, partner cloud service 122). In some implementations, one or more "spokesman" nodes operate as a smart home controller. On the other hand, the devices that are battery-powered are the "low-power" nodes. These nodes tend to be smaller than spokesman nodes and typically only communicate using wireless protocols that require very little power, such as Zigbee, ZWave, 6LoWPAN, Thread, Bluetooth, etc.

Some low-power nodes may be incapable of bidirectional communication. These low-power nodes send messages but are unable to "listen". Thus, other devices in the network environment 100, such as the spokesman nodes, cannot send information to these low-power nodes.

Some low-power nodes may be capable of only a limited bidirectional communication. As a result of such limited bidirectional communication, other devices may be able to communicate with these low-power nodes only during a certain time period.

As described, in some implementations, the smart devices serve as low-power and spokesman nodes to create a mesh network in the network environment 100. In some implementations, individual low-power nodes in the network environment regularly send out messages regarding what they are sensing, and the other low-powered nodes in the network environment—in addition to sending out their own messages-forward the messages, thereby causing the messages to travel from node to node (i.e., device to device) throughout the HAN 202. In some implementations, the spokesman nodes in the HAN 202, which are able to communicate using a relatively high-power communication protocol (e.g., IEEE 802.11), are able to switch to a relatively low-power communication protocol (e.g., IEEE 802.15.4) to receive these messages, translate the messages to other communication protocols, and send the translated messages to other spokesman nodes and/or the server system 206 (using, e.g., the relatively high-power communication protocol). Thus, the low-powered nodes using low-power communication protocols are able to send and/or receive messages across the entire HAN 202, as well as over the Internet (e.g., network 108) to the server system 206. In some implementations, the mesh network enables the server system 206 to regularly receive data from most or all of the smart devices in the home, make inferences based on the data, facilitate state synchronization across devices within and outside of the HAN 202, and send commands to one or more of the smart devices to perform tasks in the network environment.

As described, the spokesman nodes and some of the low-powered nodes are capable of "listening." Accordingly, users, other devices, and/or the server system 206 may communicate control commands to the low-powered nodes. For example, a user may use the end-user device 168 (e.g., a smart phone) to send commands over the Internet to the server system 206, which then relays the commands to one or more spokesman nodes in the HAN 202. The spokesman nodes may use a low-power protocol to communicate the commands to the low-power nodes throughout the HAN 202, as well as to other spokesman nodes that did not receive the commands directly from the server system 206.

In some implementations, a lighting unit 138 (FIG. 1B), which is an example of a smart device 204, may be a low-power node. In addition to housing a light source, the lighting unit 138 may house an occupancy sensor (e.g., occupancy sensor 150), such as an ultrasonic or passive IR sensor, and an ambient light sensor (e.g., ambient light sensor 170), such as a photo resistor or a single-pixel sensor that measures light in the room. In some implementations, the lighting unit 138 is configured to activate the light source when its ambient light sensor detects that the room is dark and when its occupancy sensor detects that someone is in the room. In other implementations, the lighting unit 138 is simply configured to activate the light source when its ambient light sensor detects that the room is dark. Further, in some implementations, the lighting unit 138 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the HAN 202 as well as over the Internet (e.g., network 108) to the server system 206.

Other examples of low-power nodes include battery-operated versions of the hazard detectors 134. These hazard detectors 134 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like.

Furthermore, hazard detectors 134 may send messages that correspond to each of the respective sensors to the other devices and/or the server system 206, such as by using the mesh network as described above.

Examples of spokesman nodes include entryway interface devices 146 (e.g., smart doorbells), thermostats 132, control panels 166, electrical outlets or devices 154, and other wireless network devices 140. These devices are often located near and connected to a reliable power source, and therefore may include more power-consuming components, such as one or more communication chips capable of bidirectional communication in a variety of protocols.

In some implementations, the network environment 100 includes controlled systems 156, such as service robots, that are configured to carry out, in an autonomous manner, any of a variety of household tasks.

As explained with reference to FIG. 1B, in some implementations, the network environment 100 includes a hub device (e.g., hub 176) that is communicatively coupled to the network(s) 108 directly or via a network interface 208 (e.g., access point 110). The hub 176 is further communicatively coupled to one or more of the smart devices 204 using a radio communication network that is available at least in the network environment 100. Communication protocols used by the radio communication network include, but are not limited to, ZigBee, Z Wave, Insteon, EuOcean, Thread, OSIAN, Bluetooth Low Energy, and the like. In some implementations, the hub 176 not only converts the data received from each smart device to meet the data format requirements of the network interface 208 or the network(s) 108, but also converts information received from the network interface 208 or the network(s) 108 to meet the data format requirements of the respective communication protocol associated with a targeted smart device. In some implementations, in addition to data format conversion, the hub 176 further processes the data received from the smart devices or information received from the network interface 208 or the network(s) 108 preliminary. For example, the hub 176 can integrate inputs from multiple sensors/connected devices (including sensors/devices of the same and/or different types), perform higher-level processing on those inputs—e.g., to assess the overall environment and coordinate operation among the different sensors/devices—and/or provide instructions to the different devices based on the collection of inputs and programmed processing. It is also noted that in some implementations, the network interface 208 and the hub 176 are integrated into one network device. Functionality described herein is representative of particular implementations of smart devices, control application(s) running on a representative electronic device(s) (such as a smart phone), hub(s) 176, and server system(s) 206 coupled to hub(s) 176 via the Internet or other Wide Area Network. All or a portion of this functionality and associated operations can be performed by any elements of the described system—for example, all or a portion of the functionality described herein as being performed by an implementation of the hub can be performed, in different system implementations, in whole or in part on the server, one or more connected smart devices and/or the control application, or different combinations thereof.

Figure 2B:
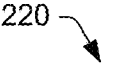
FIG. 2B illustrates an example operating environment in which a server system provides data processing for monitoring and facilitating review of events in video streams captured by cameras.

FIG. 2B illustrates a representative operating environment 220 in which a server system 206 provides data processing for monitoring and facilitating review of events (e.g., motion, audio, security, etc.) in video streams captured by cameras 136 (e.g., video cameras, doorbell cameras). As shown in FIG. 2B, the server system 206 receives video data from video sources 222 (including video cameras 224 or video-recording doorbells 226) located at various physical locations (e.g., inside or in proximity to homes, restaurants, stores, streets, parking lots, and/or the network environments 100 and 130 of FIGS. 1A and 1B). Each video source 222 may be linked to one or more reviewer accounts, and the server system 206 provides video monitoring data for the video source 222 to client devices 228 associated with the reviewer accounts. For example, the portable end-user device 168 is an example of the client device 228. In some implementations, the server system 206 is a video processing server that provides video processing services to the video sources and client devices 228.

In some implementations, the server system 206 receives non-video data from one or more smart devices 204 (e.g., audio data, metadata, numerical data, etc.). The non-video data may be analyzed to provide context for motion events detected by the video cameras 224 and/or the video-recording doorbells 226. In some implementations, the non-video data indicates that an audio event (e.g., detected by an audio device such as an audio sensor integrated into the network-connected speaker 178), a security event (e.g., detected by a perimeter monitoring device such as the camera 136 and/or a motion sensor), a hazard event (e.g., detected by the hazard detector 134), medical event (e.g., detected by a health-monitoring device), or the like has occurred within a network environment 100.

In some implementations, multiple reviewer accounts are linked to a single network environment 100. For example, multiple occupants of a network environment 100 may have accounts liked to the network environment 100. In some implementations, each reviewer account is associated with a particular level of access. In some implementations, each reviewer account has personalized notification settings. In some implementations, a single reviewer account is linked to multiple network environments 100 (e.g., multiple different HANs). For example, a person may own or occupy, or be assigned to review and/or govern, multiple network environments 100. In some implementations, the reviewer account has distinct levels of access and/or notification settings for each network environment.

In some implementations, each of the video sources 222 includes one or more video cameras 224 or video-recording doorbells 226 that capture video and send the captured video to the server system 206 substantially in real-time. In some implementations, each of the video sources 222 includes one or more doorbells 226 that capture video and send the captured video to the server system 206 in real-time (e.g., within 1 second, 10 seconds, 30 seconds, or 1 minute). Each of the doorbells 226 may include a video camera that captures video and sends the captured video to the server system 206 in real-time. In aspects, a video source 222 includes a controller device (not shown) that serves as an intermediary between the one or more doorbells 226 and the server system 206. The controller device receives the video data from the one or more doorbells 226, optionally performs some preliminary processing on the video data, and sends the video data and/or the results of the preliminary processing to the server system 206 on behalf of the one or more doorbells 226 (e.g., in real-time). In some implementations, each camera has its own on-board processing capabilities to perform some preliminary processing on the captured video data before sending the video data (e.g., along with metadata obtained through the preliminary processing) to the controller device and/or the server system 206. In some implementations, one or more of the cameras is configured to, optionally, locally store the video data (e.g., for later transmission if requested by a user). In some implementations, a camera is configured to perform some processing of the captured video data and, based on the processing, either send the video data in substantially real-time, store the video data locally, or disregard the video data.

In accordance with some implementations, a client device 228 includes a client-side module 230. In some implementations, the client-side module communicates with a server-side module 232 executed on the server system 206 through the one or more networks 108. The client-side module provides client-side functionality for the event-monitoring and review-processing and communications with the server-side module. The server-side module provides server-side functionality for event-monitoring and review-processing for any number of client-side modules each residing on a respective client device 228 (e.g., any one of client devices 228-1 to 228-m). In some implementations, the server-side module 232 also provides server-side functionality for video processing and camera control for any number of the video sources 222, including any number of control devices, cameras 136, and doorbells 226.

In some implementations, the server system 206 includes one or more processors 234, a video storage database 236, an account database 238, an input/output (I/O) interface 240 to one or more client devices 228, and an I/O interface 242 to one or more video sources 222. The I/O interface 242 to one or more client devices 228 facilitates the client-facing input and output processing. The account database 238 stores a plurality of profiles for reviewer accounts registered with the video processing server, where a respective user profile includes account credentials for a respective reviewer account and one or more video sources linked to the respective reviewer account. The I/O interface 242 to one or more video sources 218 facilitates communications with one or more video sources 222 (e.g., groups of one or more doorbells 226, cameras 136, and associated controller devices). The video storage database 236 stores raw video data received from the video sources 222, as well as various types of metadata, such as motion events, event categories, event categorization models, event filters, and event masks, for use in data processing for event monitoring and review for each reviewer account.

Examples of a representative client device 228 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an ebook reader, or a combination of any two or more of these data processing devices or other data processing devices.

Examples of the one or more networks 108 include local area networks (LAN) and wide area networks (WAN) such as the Internet. The one or more networks 108 are implemented using any known network protocol, including various wired or wireless protocols, such as Ethernet, Universal Serial Bus (USB), FIREWIRE, Long Term Evolution (LTE), Global System for Mobile (GSM) Communications, Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol.

In some implementations, the server system 206 is implemented on one or more standalone data processing apparatuses or a distributed network of computers. The server system 206 may also employ various virtual devices and/or services of third-party service providers (e.g., third-party cloud service providers) to provide the underlying computing resources and/or infrastructure resources of the server system 206. In some implementations, the server system 206 includes, but is not limited to, a server computer, a handheld computer, a tablet computer, a laptop computer, a desktop computer, or a combination of any two or more of these data processing devices or other data processing devices.

The server-client environment shown in FIG. 2B includes both a client-side portion (e.g., the client-side module) and a server-side portion (e.g., the server-side module). The division of functionality between the client and server portions of the operating environment can vary in different implementations. Similarly, the division of functionality between a video source 222 and the server system 206 can vary in different implementations. For example, in some implementations, the client-side module is a thin client that provides only user-facing input and output processing functions, and delegates all other data processing functionality to a backend server (e.g., the server system 206). Similarly, in some implementations, a respective one of the video sources 222 is a simple video capturing device that continuously captures and streams video data to the server system 206 with limited or no local preliminary processing on the video data. Although many aspects of the present technology are described from the perspective of the server system 206, the corresponding actions performed by a client device 228 and/or the video sources 222 would be apparent to one of skill in the art. Similarly, some aspects of the present technology may be described from the perspective of a client device or a video source, and the corresponding actions performed by the video server would be apparent to one of skill in the art. Furthermore, some aspects of the present technology may be performed by the server system 206, a client device 228, and a video source 222 cooperatively.

In some aspects, a video source 222 (e.g., a video camera 224 or a doorbell 226 having an image sensor) transmits one or more streams 244 of video data to the server system 206. In some implementations, the one or more streams include multiple streams, having respective resolutions and/or frame rates, of the raw video captured by the image sensor. In some implementations, the multiple streams include a "primary" stream (e.g., 244-1) with a certain resolution and frame rate, corresponding to the raw video captured by the image sensor, and one or more additional streams (e.g., 244-2 through 244-q). An additional stream is optionally the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream. In some implementations, the primary stream and/or the additional streams are dynamically encoded (e.g., based on network conditions, server operating conditions, camera operating conditions, characterization of data in the stream (e.g., whether motion is present), user preferences, and the like.

In some implementations, one or more of the streams 244 is sent from the video source 222 directly to a client device 228 (e.g., without being routed to, or processed by, the server system 206). In some implementations, one or more of the streams is stored at a local memory of the doorbell 226 and/or at a local storage device (e.g., a dedicated recording device), such as a digital video recorder (DVR). For example, in accordance with some implementations, the doorbell 226 stores the most-recent 24 hours of video footage recorded by the camera. In some implementations, portions of the one or more streams are stored at the doorbell 226 and/or the local storage device (e.g., portions corresponding to particular events or times of interest).

In some implementations, the server system 206 transmits one or more streams 246 of video data to a client device 228 to facilitate event monitoring by a user. In some implementations, the one or more streams may include multiple streams, of respective resolutions and/or frame rates, of the same video feed. In some implementations, the multiple streams include a "primary" stream (e.g., 246-1) with a certain resolution and frame rate, corresponding to the video feed, and one or more additional streams (e.g., 246-2 through 246-*t***). An additional stream may be the same video stream as the "primary" stream but at a different resolution and/or frame rate, or a stream that shows a portion of the "primary" stream (e.g., cropped to include a portion of the field of view or pixels of the primary stream) at the same or different resolution and/or frame rate as the "primary" stream.

FIG. 3 is a block diagram illustrating the server system 206 in accordance with some implementations. The server system 206 typically includes one or more processors 302, one or more network interfaces 304 (e.g., including the I/O interface 240 to one or more client devices and the I/O interface 242 to one or more electronic devices), memory 306, and one or more communication buses 308 for interconnecting these components (sometimes called a chipset). The memory 306 includes high-speed random access memory, such as DRAM, SRAM, DDR SRAM, or other random access solid-state memory devices; and, optionally, includes non-volatile memory, such as one or more magnetic disk storage devices, one or more optical disk storage devices, one or more flash memory devices, or one or more other non-volatile solid-state storage devices. The memory 306, optionally, includes one or more storage devices remotely located from one or more of the processors 302. The memory 306, or alternatively the non-volatile memory within memory 306, includes a non-transitory computer-readable storage medium. In some implementations, the memory 306, or the non-transitory computer-readable storage medium of the memory 306, stores the following programs, modules, and data structures, or a subset or superset thereof:

- an operating system 310 including procedures for handling various basic system services and for performing hardware-dependent tasks;
- a network communication module 312 for connecting the server system 206 to other systems and devices (e.g., client devices, electronic devices, and systems connected to one or more networks 108) via one or more network interfaces 304 (wired or wireless);
- a server-side module 314 (e.g., server-side module 232), which provides server-side functionalities for device control, data processing, and data review, including, but not limited to:
  - a data receiving module 316 for receiving data from electronic devices (e.g., video data from a doorbell 226, FIG. 1), and preparing the received data for further processing and storage in a data storage database (e.g., media storage database 360),
  - a device control module 318 for generating and sending server-initiated control commands to modify operation modes of electronic devices (e.g., devices of a network environment 100), and/or receiving (e.g., from client devices 228) and forwarding user-initiated control commands to modify operation modes of the electronic devices,

- a data processing module 320 for processing the data provided by the electronic devices, and/or preparing and sending processed data to a device for review (e.g., client devices 228 for review by a user), including, but not limited to:
  - a video processor sub-module 322 for processing (e.g., categorizing and/or recognizing) detected entities and/or event candidates within a received video stream (e.g., a video stream from doorbell 226):
  - a user interface sub-module 324 for communicating with a user (e.g., sending alerts, timeline events, etc. and receiving user edits and zone definitions and the like); and
  - a data model manager 326 for managing storage and organization of data (e.g., snapshots, metadata) received from each electronic device in a video surveillance system structure, as well as synchronization of the data across multiple electronic devices in the structure and managing alerts to the structure manager; and
- a server database 340, including but not limited to:
  - a data storage database 342 for storing data associated with each electronic device (e.g., each doorbell) of each user account, as well as data processing models, processed data results, and other relevant metadata (e.g., names of data results, location of electronic device, creation time, duration, settings of the electronic device, etc.) associated with the data, where (optionally) all or a portion of the data and/or processing associated with the hub 176 or smart devices are stored securely;
  - an account database 344 for storing account information for user accounts, including user account information such as user profiles 346, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., a media access control (MAC) address and universally unique identifier (UUID)), device-specific secrets, and displayed titles;
  - a device information database 348 for storing device information related to one or more devices such as device profiles 350, e.g., device identifiers and hub device-specific secrets, independently of whether the corresponding hub devices have been associated with any user account;
  - an event information database 352 for storing event information such as event records 354 and context information, e.g., contextual data describing circumstances surrounding an approaching visitor;
  - a categorization model database 356 for storing event categorization models related to event categories for categorizing events detected by, or involving, the smart device;
  - a data model database 358 for storing reference exemplars organized and grouped into clusters associated with the wireless network devices that captured images corresponding to the reference exemplars; and a media storage database 360 for storing snapshots (e.g., cropped headshots) of face detections in images captured by the wireless network devices in the structure.

Each of the above-identified elements may be stored in one or more of the previously mentioned memory devices and may correspond to a set of instructions for performing a function described above. The above-identified modules or programs (e.g., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above. Furthermore, the memory 306, optionally, stores additional modules and data structures not described above.

Figure 4:
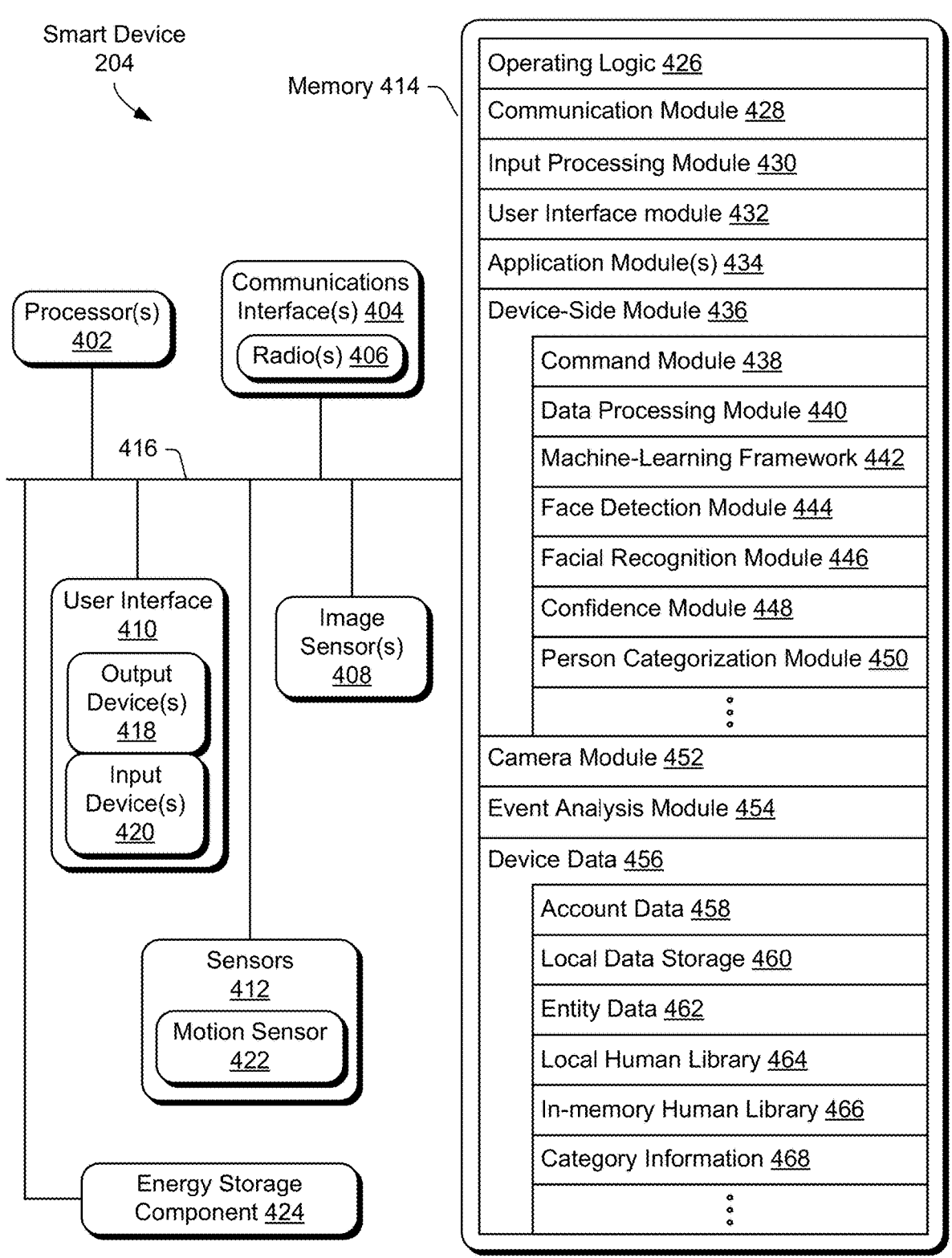
FIG. 4 is a block diagram illustrating an example smart device in accordance with some implementations.

FIG. 4 is a block diagram illustrating an example smart device 204 in accordance with some implementations. In some implementations, the smart device 204 (e.g., any device of the network environment 100 in FIG. 1, including end-user device 168, or of FIG. 2B, e.g., a doorbell 226) includes one or more processors 402 (e.g., CPUs, ASICs, FPGAs, microprocessors, and the like), one or more communication interfaces 404 with radios 406, image sensor (s) 408, user interfaces(s) 410, sensor(s) 412, memory 414, and one or more communication buses 416 for interconnecting these components (sometimes called a chipset). In some implementations, the user interface 410 includes one or more output devices 418 that enable presentation of media content, including one or more speakers and/or one or more visual displays. In some implementations, the user interface 410 includes one or more input devices 420, including user interface components that facilitate user input such as a keyboard, a mouse, a voice-command input unit or microphone, a touch screen display, a touch-sensitive input pad, a gesture capturing camera, or other input buttons or controls. In some implementations, an input device 420 for a doorbell 226 is a tactile or touch-sensitive doorbell button. Furthermore, some smart devices 204 use a microphone and voice recognition or a camera and gesture recognition to supplement or replace the keyboard.

The sensor(s) 422 include, for example, one or more thermal radiation sensors, ambient temperature sensors, humidity sensors, infrared (IR) sensors such as passive infrared (PIR) sensors, proximity sensors, range sensors, occupancy sensors (e.g., using RFID sensors), ambient light sensors (ALS), motion sensors 422, location sensors (e.g., global positioning satellite (GPS) sensors), accelerometers, and/or gyroscopes.

In some implementations, the smart device 204 includes an energy storage component 424 (e.g., one or more batteries and/or capacitors). In some implementations, the energy storage component 424 includes a power management integrated circuit (IC). In some implementations, the energy storage component 424 includes circuitry to harvest energy from signals received via an antenna (e.g., the radios 406) of the smart device. In some implementations, the energy storage component 424 includes circuitry to harvest thermal, vibrational, electromagnetic, and/or solar energy received by the smart device. In some implementations, the energy storage component 424 includes circuitry to monitor a stored energy level and adjust operation and/or generate notifications based on changes to the stored energy level.

The communication interfaces 404 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. The radios 406 enable one or more radio communication networks in the network environments 100 and enable a smart device 204 to communicate with other devices. In some implementations, the radios 406 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.).

The memory 414 includes high-speed random access memory, such as DRAM, SRAM, DDR RAM, or other random access solid-state memory devices; and, optionally, includes non-volatile memory, such as one or more magnetic disk storage devices, one or more optical disk storage devices, one or more flash memory devices, or one or more other non-volatile solid state storage devices. The memory 414, or alternatively the non-volatile memory within the memory 414, includes a non-transitory computer-readable storage medium. In some implementations, the memory 414, or the non-transitory computer-readable storage medium of the memory 414, stores the following programs, modules, and data structures, or a subset or superset thereof:

operating system 426 including procedures for handling various basic system services and for performing hardware-dependent tasks;

a communication module 428 for coupling to and communicating with other network devices (e.g., a network interface 208, such as a router that provides Internet connectivity, networked storage devices, network routing devices, a server system 206, other smart devices 204, client devices 228, etc.) connected to one or more networks 108 via one or more communication interfaces 404 (wired or wireless);

an input processing module 430 for detecting one or more user inputs or interactions from the one or more input devices 420 and interpreting the detected inputs or interactions;

a user interface module 432 for providing and presenting a user interface in which settings, captured data, and/or other data for one or more devices (e.g., the smart device 204, and/or other devices in a network environment 100) can be configured and/or viewed;

one or more applications 434 for execution by the smart device (e.g., games, social network applications, smart home applications, and/or other web or non-web based applications) for controlling devices (e.g., executing commands, sending commands, and/or configuring settings of the smart device 204 and/or other client/ electronic devices), and for reviewing data captured by devices (e.g., device status and settings, captured data, or other information regarding the smart device 204 and/or other client/electronic devices);

a device-side module 436, which provides device-side functionalities for device control, data processing, and data review, including but not limited to:

a command module 438 for receiving, forwarding, and/or executing instructions and control commands (e.g., from a client device 228, from a server system 206, from user inputs detected on the user interface 410, etc.) for operating the smart device 204;

a data processing module 440 for processing data captured or received by one or more inputs (e.g., input devices 420, image sensor(s) 408, sensors 412, interfaces (e.g., communication interfaces 404, radios 406), and/or other components of the smart device 204, and for preparing and sending processed data to a remote device (e.g., client devices 228) for review by a user;

an on-device machine-learning (ML) framework 442 for facilitating activities (including end-to-end support) involved in a machine learning life cycle, including data engineering, ML model development, hyper parameter tuning, testing, logging, monitoring, and deployment;

a face detection module 444 for running a face detection model, which is an ML model for face detection tasks, including detecting one or more faces in one or more images captured by the image sensor 408 of the smart device 204;

a facial recognition module 446 for running a facial recognition model, which is an ML model for facial recognition tasks, including generating a face embedding of the face detected in the image and/or using the face embedding to search for and identify a matching cluster;

a confidence module 448 for running an ML model to measure a recognizability of a face detection by the face detection module 444 and/or a quality of a face embedding generated by the facial recognition module 446; and a person categorization module 450 for categorizing a person (e.g., the detected face) in an image according to a result of the facial recognition module 446 or a user input indicating whether the structure manager knows or does not know the person;

a camera module 452 for operating the image sensor(s) 408 and associated circuitry, e.g., for enabling and disabling the image sensor(s) 408 based on data from one or more low-power sensors 412 (e.g., data from a PIR sensor or ALS) and for adjusting encoding of raw image data captured by the image sensor(s) 408 (e.g., adjusting format, resolution, and/or framerate);

an event analysis module 454 for analyzing captured sensor data, e.g., to detect and/or recognize approaching visitors and context information, including but not limited to:

motion detect module for detecting events in the network environment (e.g., motion events in the video data), such as an approaching visitor; and a context sensing module for sensing context data regarding the approaching visitor, e.g., based on behavioral characteristics, timing information, and status of the network environment; and a characterization module for characterizing entities, persons (e.g., the approaching visitor), and/or events detected by, or associated with, the smart device 204;

device data 456 storing data associated with devices (e.g., the smart device 204), including, but not limited to:

account data 458 storing information related to user accounts linked to the smart device 204, e.g., including cached login credentials, smart device identifiers (e.g., MAC addresses and UUIDs), user interface settings, display preferences, authentication tokens and tags, password keys, and the like;

local data storage 460 for selectively storing raw or processed data associated with the smart device 204, such as event data and/or video data captured by the image sensor(s) 408;

entity data 462 storing information related to detected persons and other entities, such as characterization information and associated images;

local human library 464 for storing exemplars organized into sets of clusters (e.g., one or more clusters are assigned to a same person), an associated identifier, a category for the assigned person, and, if provided by the structure manager, an associated name, an in-memory human library 466 for storing in RAM a copy of the data in the local human library 464 and for local facial recognition tasks by the device (e.g., the in-memory human library 466 can be different from the local human library 464 stored on the device disk);

category information 468 detailing event categories for categorizing events detected by, or involving, the smart device (e.g., in conjunction with the event analysis module 454).

Each of the above-identified elements may be stored in one or more of the previously mentioned memory devices and correspond to a set of instructions for performing a function described above. The above-identified modules or programs (i.e., sets of instructions) need not be implemented as separate software programs, procedures, or modules, and thus various subsets of these modules may be combined or otherwise rearranged in various implementations. In some implementations, the memory 414, optionally, stores a subset of the modules and data structures identified above. Furthermore, the memory 414, optionally, stores additional modules and data structures not described above, such as a sensor management module for managing operation of the sensor(s) 412.

FIG. 5 is a block diagram illustrating a representative client device 228 associated with a user account in accordance with some implementations. The client device 228, typically, includes one or more processing units (CPUs) 502, one or more network interfaces 504, memory 506, and one or more communication buses 508 for interconnecting these components (sometimes called a chipset). Optionally, the client device also includes a user interface 510 and one or more built-in sensors 512 (e.g., accelerometer and gyroscope). The user interface 510 includes one or more output devices 514 that enable presentation of media content, including one or more speakers and/or one or more visual displays. The user interface 510 also includes one or more input devices 516, including user interface components that facilitate user input such as a keyboard, a mouse, a voice-command input unit or microphone, a touch screen display, a touch-sensitive input pad, a gesture capturing camera, or other input buttons or controls. Furthermore, some of the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 518, such as a GPS sensor or other geo-location receiver, for determining the location of the client device.

The memory 506 includes high-speed random access memory, such as DRAM, SRAM, DDR SRAM, or other random access solid-state memory devices; and, optionally, includes non-volatile memory, such as one or more magnetic disk storage devices, one or more optical disk storage devices, one or more flash memory devices, or one or more other non-volatile solid state storage devices. The memory 506, optionally, includes one or more storage devices remotely located from one or more processing units 502. The memory 506, or alternatively the non-volatile memory within the memory 506, includes a non-transitory computer-readable storage medium. In some implementations, the memory 506, or the non-transitory computer-readable storage medium of the memory 506, stores the following programs, modules, and data structures, or a subset or superset thereof:

an operating system 520 including procedures for handling various basic system services and for performing hardware-dependent tasks;

a network communication module 522 for connecting the client device 228 to other systems and devices (e.g., client devices, electronic devices, and systems connected to one or more networks 108) via one or more network interfaces 504 (wired or wireless);

an input processing module 524 for detecting one or more user inputs or interactions from one of the one or more input devices 516 and interpreting the detected input or interaction;

one or more applications 526 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);

a user interface module 528 for providing and displaying a user interface in which settings, captured data, and/or other data for one or more devices (e.g., smart devices 204 in network environment 100) can be configured and/or viewed;

a client-side module 530 (e.g., client-side module 230), which provides client-side functionalities for device control, data processing, and data review, including but not limited to:

a device control module 532 for generating control commands for modifying an operating mode of smart devices (and optionally other electronic devices) in accordance with user inputs;

a video analysis module 534 for analyzing captured video data, e.g., to detect and/or recognize persons, objects, animals, and events, such as described previously with respect to the event analysis module 454;

a data review module 536 for providing user interfaces for reviewing data from the server system 206 or video sources 222, including but not limited to:

an event review module 538 for reviewing events (e.g., motion and/or audio events), and optionally enabling user edits and/or updates to the events; and a persons review module 540 for reviewing data and/or images regarding detected persons and other entities, and optionally enabling user edits and/or updates to the persons data;

a presentation module 542 for presenting user interfaces and response options for interacting with the smart devices 204 and/or the server system 206; and a remote interaction module 544 for interacting with a remote person (e.g., a visitor to the network environment 100), e.g., via a smart device 204 and/or the server system 206; and client data 546 storing data associated with the user account and electronic devices, including, but not limited to:

account data 548 storing information related to both user accounts loaded on the client device and electronic devices (e.g., of the video sources 222) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and a local data storage database 550 for selectively storing raw or processed data associated with electronic devices (e.g., of the video sources 222, such as a doorbell 226), optionally including entity data described previously.

Each of the above-identified elements may be stored in one or more of the previously mentioned memory devices and may correspond to a set of instructions for performing a function described above. The above-identified modules or programs (i.e., sets of instructions) need not be implemented as separate software programs, procedures, modules, or data structures, and thus various subsets of these modules may be combined or otherwise rearranged in various implementations. In some implementations, the memory 506, optionally, stores a subset of the modules and data structures identified above. Furthermore, the memory 506, optionally, stores additional modules and data structures not described above.

These and other capabilities and configurations, as well as ways in which entities of FIG. 1A through 5 act and interact, are set forth in greater detail below. The entities described with respect to FIG. 1A through FIG. 5 may be further divided, combined, and so on. The environment 100 of FIG. 1A, the environment 130 of FIG. 1B, and the detailed illustrations of FIG. 2A through FIG. 10 illustrate some of many possible environments, devices, and methods capable of employing the described techniques, whether individually or in combination with one another.

Example Implementations

Figure 6:
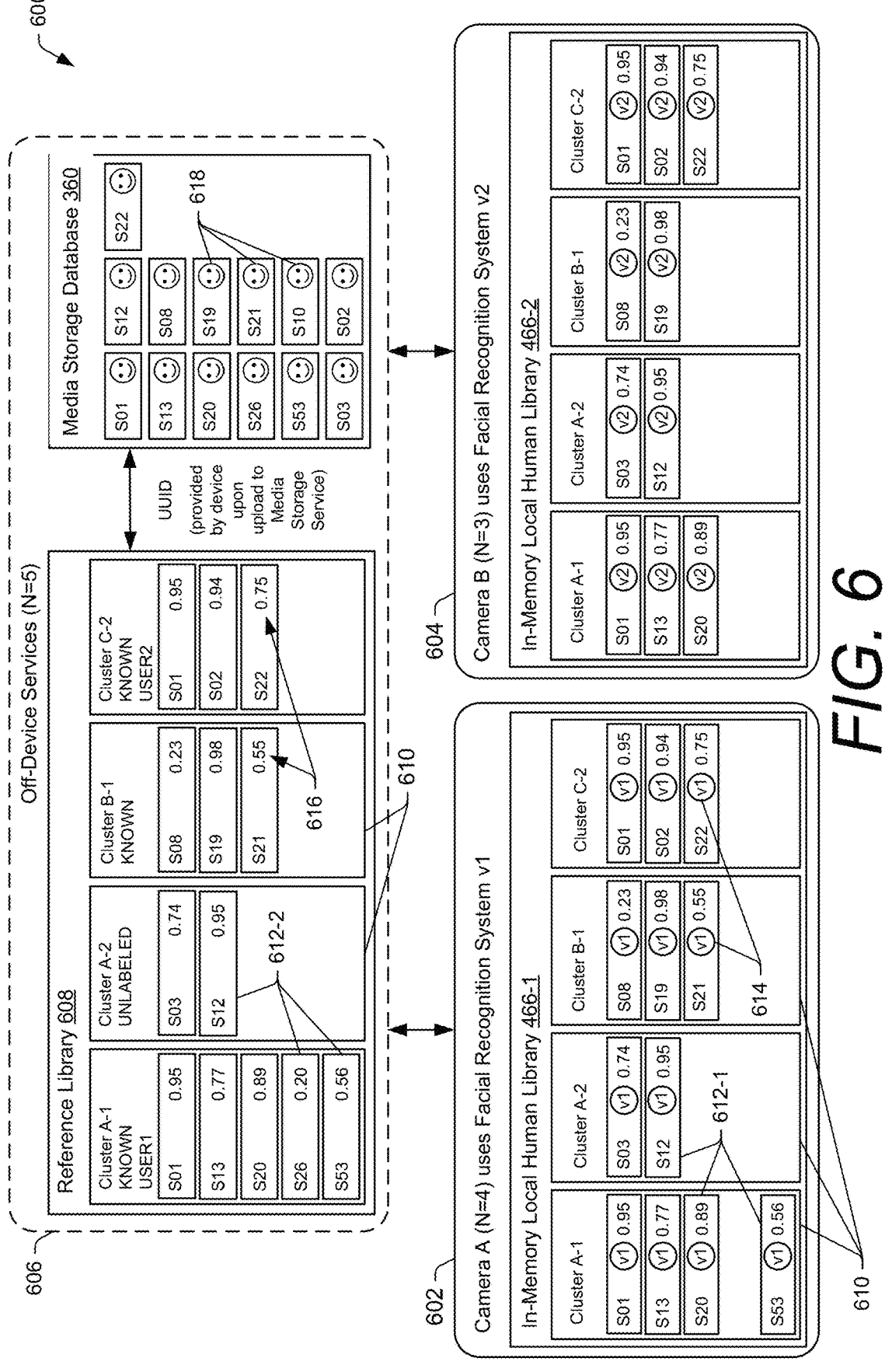
FIG. 6 illustrates an example decentralized multi-device system for on-device facial recognition.

FIG. 6 illustrates an example decentralized multi-device system 600 for on-device facial recognition. In particular, FIG. 6 shows an example structure of human libraries in the multi-device system 600, which is illustrated with two example devices (e.g., camera A 602 and camera B 604) in communication with an off-device service 606 (e.g., cloud service 112, server system 206).

The off-device service 606 includes a reference library (e.g., reference library 608), which is stored in the data model database 358 and managed by the data model manager 326 (in FIG. 3). In the reference library 608 of the off-device service 606, a name, cluster information, and exemplar information are stored for each human in a particular category. Face embeddings, including biometric data, generated by the device are not stored off-device (e.g., outside of the camera). Further, face embeddings are not stored at the off-device services 606 and the off-device services 606 do not generate face embeddings.

Each camera includes a local human library (e.g., in-memory local human library 466-1 in camera A 602, in-memory local human library 466-2 in camera B 604). The local human library includes data associated with the people that have been "seen" by the whole system. Each local human library includes one or more clusters 610 (e.g., cluster A-1, cluster A-2, cluster B-1, cluster C-2). Within each cluster is snapshot data (e.g., one or more face exemplars 612) corresponding to that cluster. In the illustrated example, the cameras 602 and 604 include exemplars 612-1 and the off-device services 606 include reference exemplars 612-2. In some implementations, the exemplars 612-1 stored on the cameras 602 and 604 may be a subset of the reference exemplars 612-2 stored at the off-device services 606.

Different cameras may store different numbers of face exemplars 612 locally based on their respective storage and computation capabilities. The term "N" on each camera (and the off-device service) shows the maximum number of face exemplars 612 that that camera (or the off-device service) can store per cluster. For simplicity, camera A 602 is illustrated with N=4, camera B 604 is illustrated with N=3, and the off-device service 606 is illustrated with N=5. Any suitable integer can be used for N, which corresponds to the device's storage and computation capabilities.

For the exemplars 612 in a local library, a camera stores face embeddings, quality and/or confidence scores, and a time the snapshot of the person was captured. The term "S ##" (e.g., S01, S02, S03, . . . Snn) denotes the exemplar identifier (e.g., UUID). A face embedding 614 computed for each snapshot is represented in FIG. 6 by a circle (indicative of a digital "fingerprint" of the face in the snapshot). Within each circle (e.g., face embedding 614) is an indication of a version (e.g., v1, v2, v3, . . . , vn) of the facial recognition model or system used to compute that face embedding by that device. Different devices can use different versions of the facial recognition model. In the illustrated example, camera A 602 uses a first local version (v1) of a facial recognition system model and camera B 604 uses a second local version (v2) of the facial recognition system model. Accordingly, each camera uses its own version of the same machine learning (ML) model for facial recognition. Notice that the off-device services 606 do not include the face embeddings 614 (e.g., the biometric data) and each camera has generated (without sharing with another device or each other) its face embeddings 614 by using its own version of the facial recognition model.

Each exemplar 612 also includes a quality score 616 of that exemplar in relation to the facial recognition model. The quality score 616 is a measure of a linear or non-linear combination of various factors associated with the quality of the snapshot. Example factors may include image blurriness, face angle, a confidence score, and so forth.

In some implementations, for the reference library 608, the cluster data (excluding the actual snapshots and face embeddings) can be stored in the data model database 358 and managed by the data model manager 326. Snapshots (e.g., face snapshots 618) can be stored in a media storage service (e.g., the media storage database 360) and linked to a corresponding exemplar UUID, which is provided to the media storage service upon successful upload. In some implementations, the cluster data and the face snapshots 618 can be stored in a single database (e.g., data model database 358) at the off-device service 606. The off-device services 606 store the reference exemplars 612-2 and the face snapshots 618 as backup in the event that a device crashes or is reset.

A list of clusters for each device may be synced between the devices (including all the devices) of the multi-device system 600 to match a list of clusters in the reference library 608. If a device is turned off when the list changes, that device can receive the updates at any time after it is turned on. Creating a new cluster is initiated by a device (e.g., camera A 602, camera B 604) and propagated by the device to the reference library 608 and other devices afterward. In some implementations, the new cluster may be propagated directly to another device via a direct communication channel, without routing through the off-device services 606. To prevent multiple devices in the multi-device system 600 from using the same cluster ID when creating new clusters simultaneously, the cluster ID may be defined as:

<structure_id>_<device_unique_id>_<counter_local_to_device>

In the illustrated example, the cluster IDs A-1 and A-2 represent two clusters created by camera A 602. Cluster B-1 represents a cluster created by camera B 604. Cluster C-2 represents a cluster (a second cluster) created by another camera (e.g., camera C), which is no longer in the structure, either because it was removed or re-setup with a different tag (either A or B).

Each cluster is associated with a particular category, which identifies the person as known, unlabeled, or invalid. The known category indicates that the user has confirmed that they know the person, thus any match to the clusters of this human results in a "familiar" person notification. The unlabeled category indicates that the user has not yet confirmed whether they know this person. Any match to the cluster of this person results in an "unfamiliar" person notification. The invalid category means the detection is not a real human and was a mistake by the face detection logic. The structure manager may also input a name to a person identified by the system. For example, cluster A-1 in the off-device services 606 is labeled as "USER1" and cluster C-2 is labeled as "USER2," based on user input by the structure manager.

Cluster removal, which is initiated by the structure manager (e.g., user), is propagated from the data model manager 326 to all devices in the structure. Cluster merge, which is associating the same human to multiple clusters, is handled by the data model manager 326 without any change to the local human library of respective devices in the structure and without any change to the in-memory human library of respective devices in the structure. Any exemplar removal, whether initiated by the structure manager or by the data model manager 326, is propagated to all devices in the structure. Further detail of these and other features is described below.

When a device (e.g., camera A 602, camera B 604) in the structure starts up, it reads its local human library 608 from local storage into RAM to be used for recognition. Meanwhile, the device attempts to connect to the off-device service 606 to download a copy of the reference library 608. If there is no local human library 608 available, the device waits to receive the copy of the reference library 608 before initiating a recognition task. Doing so avoids recognizing familiar people as unfamiliar. The reference library 608 is empty when the system starts for the first time or if the structure manager has deleted the library (or has deleted all the humans in the library). In an example, the device receives an empty library. When the device receives the copy of the reference library, the device may responsively perform any of a variety of different tasks depending on the type of reference exemplar received.

For a discovered exemplar (an exemplar for a face detected by the device but not yet added to the reference library 608 at the cloud service 112) in the in-memory human library (e.g., the in-memory local human library 466-1), for example, the device may remove one or more discovered exemplars that were created before a timestamp corresponding to a most-recent modification the received reference exemplar 612. Such discovered exemplars are the discovered exemplars that either have been rejected from adding to the reference library 608 or that have been removed from the reference library 608 at the cloud service 112 by the structure manager.

For a reference exemplar in the in-memory human library (e.g., the in-memory local human library 466-1), the device compares all the exemplars in its in-memory human library against the reference exemplars in the reference library 608 at the cloud service 112. Any reference exemplar that does not exist in the reference library anymore is removed from the in-memory human library.

For a reference exemplar that is new in the reference library (e.g., the device has not received such new reference exemplar before), the device downloads the snapshot and computes a corresponding face embedding. This process is similar to the process executed for computing a face embedding for a detection of a new face. Then, the downloaded snapshot image is discarded and the embedding (not the corresponding snapshot image) is stored locally.

After processing the downloaded reference exemplars and the downloaded snapshot image(s), the device stores the results in local storage (e.g., the local human library 608). The local human library 608 is then read and used the next time the device starts up.

In aspects, the reference library 608 can change due to any of a variety of events. For example, the reference library 608 can change due to removal of the library, an exemplar, or a human from the library by the structure manager. The reference library 608 can change due to removal of an "unlabeled" human from the library if the structure manager confirmed that they do not know that person. The reference library 608 can change due to removal of an "unlabeled" human from the library if a maximum allowed time (e.g., two weeks, four weeks) to keep the data of an unlabeled human without confirmation by the structure manager has passed. The reference library 608 can change due to a device in the system that has detected a face and sent an update (with corresponding exemplar information) to the off-device services 606 to add an exemplar to the reference library 608. When the reference library 608 changes, all devices in the structure are notified. Each of the devices in the structure may then download a copy of the reference library 608 and process the copy locally, similar to processing a copy of the reference library 608 after each startup.

Figure 7:
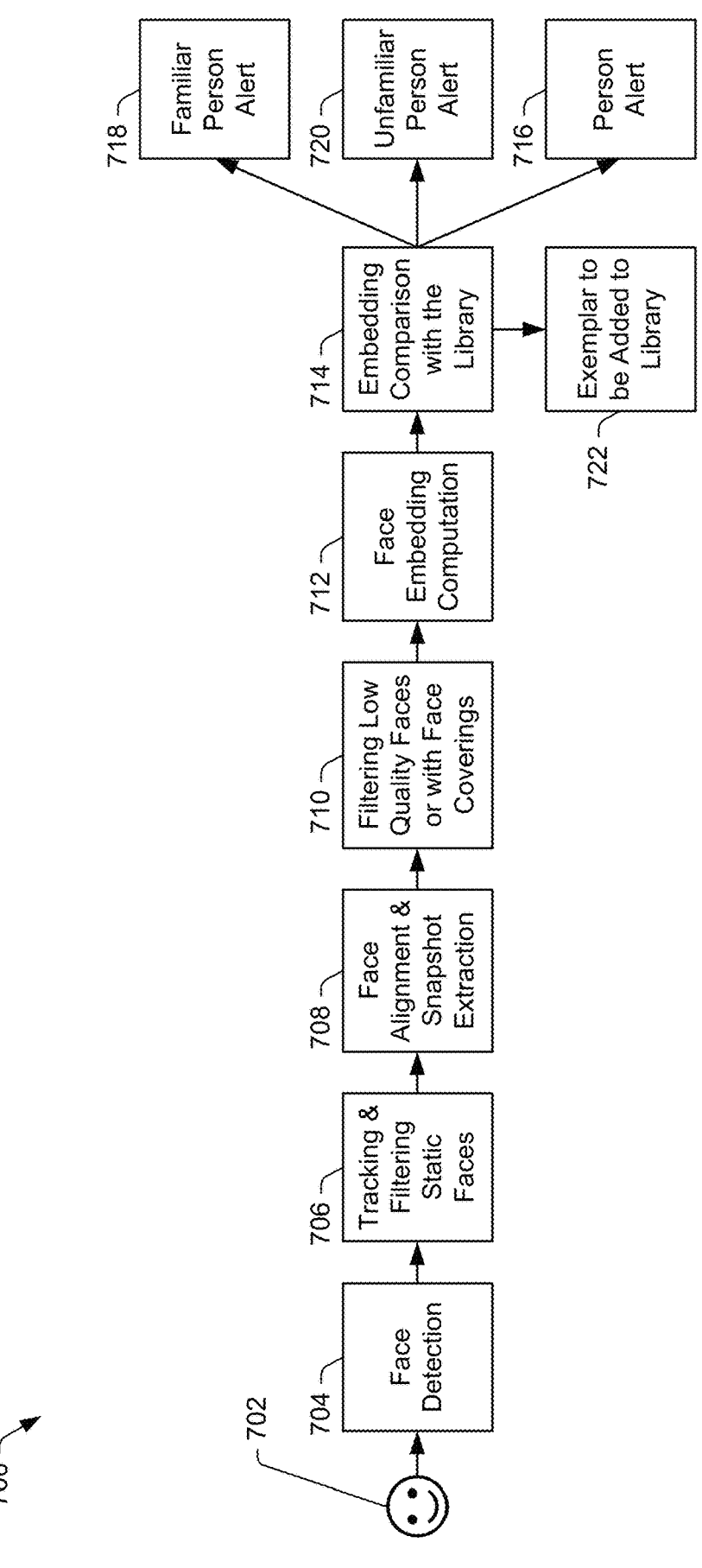
FIG. 7 illustrates a high-level flow diagram of performance of on-device person recognition.

FIG. 7 illustrates a high-level flow diagram 700 of performance of on-device person recognition. A frame 702 is used as input to compute a new face detection 704. The new face detection 704 is sent to a tracker (e.g., the face detection module 444) for tracking and filtering static faces 706. The tracker either associates the detection to an existing track or creates a new track. The track (e.g., the face track) provides temporal information to determine movement of a face relative to a previous frame. The track may include tracking information over a series of frames. Then, face alignment and snapshot extraction 708 includes the face extracted from the image and additional pre-processing operations including rotation and alignment.

The extracted face is sent to a confidence filter, which filters low-quality faces and/or faces with face coverings 710. For each face detection (e.g., face detection 704), values are generated for a face-embedding confidence, face landmarks and landmarking confidence, and a face mask confidence. The face embedding-confidence value is a score, which may be in a range of zero to one (e.g., [0, 1]), and measures the "recognizability" of the face detection 704. Being "recognizable" means the face embedding generated from this detection is more likely to be similar to embeddings of other face detections of the same person and different from embeddings of face detections of other people. In contrast, low recognizability means that the face embedding produced from the face detection is less likely to be similar to embeddings of other face detections of the same person and different from embeddings of face detections of other people. Thus, a low face embedding-confidence value (e.g., less than a threshold value) is a less-reliable embedding for the recognition task.

This face embedding-confidence value is based on estimating the L2-Norm of the face embedding itself. In some implementations, a trained ML model uses a face crop image (e.g., 128×128 pixels, 224×224 pixels) as input to output a value that correlates to the quality of the face embedding (e.g., FaceNet embedding). The pre-normalized last layer of the face embedding may correlate with the quality of the embedding. Accordingly, the model is trained to predict the magnitude of the pre-normalized layer's output and then to map the predicted output value between 0.0 and 1.0, such that values closer to 0.0 relate to a low-quality embedding (e.g., a smaller magnitude of the pre-normalized layer such as <0.5) and values closer to 1.0 relate to a high-quality embedding (e.g., a higher magnitude of the pre-normalized layer such as >0.5).

Using the face-embedding-confidence value results in higher accuracy of the recognition system compared with conventional recognition systems based on the L2-Norm of a specific layer of the face embedding model. This model may be trained on a large number of true positive and false positive face detections. Using the face embedding-confidence value also enables fewer (e.g., about one-third) computations compared with the conventional recognition systems for generating face embeddings. Thus, when the face-embedding-confidence value is low, the embedding computation can be skipped, which is beneficial when energy or latency is a constraint (e.g., in battery-powered cameras). In addition, this confidence value is usable on a continuous scale where the camera may make different decisions at different thresholds. For example, when the confidence value is lower (but not too low) (e.g., 0.45, 0.5, 0.55) and the camera infers an identity of the person, the camera may require multiple face detections to be in consensus with each other on the inferred identity before committing to that identity. A higher confidence value (above a threshold value, e.g., 0.6, 0.65, 0.7, 0.75, 0.8, 0.85, 0.9) may enable the camera to commit to the inferred identity immediately.

As described, the face landmarks and landmarking confidence are generated. For example, a model generates face landmarks from the image along with a landmarking confidence, which is a confidence value indicating a certainty of a correctness of the face landmarks. The face landmarks are key points on the face (e.g., pupils, nose-tip, lips, chin), which help in determining a pose of the face (pan, tilt, and roll angles). The face landmarks also help in readjusting pixels to make the face upright (e.g., face alignment), which improves recognition.

The face mask confidence is a value representing a likelihood of the user wearing a face mask. A model specializes in detecting visibility markers around the mouth and nose-tip area to determine if the user is wearing a mouth-and-nose covering (e.g., surgical-style mask).

If the face-embedding confidence passes a threshold, which determines whether the face detection is not a false positive, the camera generates a face embedding (e.g., face embedding computation 712), determines whether to compare 714 the face embedding with the library, and sends out a "person alert" (e.g., person alert 716). This person alert 716 may be succeeded by either a "familiar-person" alert 718 or "unfamiliar-person" alert 720 if the facial recognition module 446 is able to determine the identity of the face.

The facial recognition module 446 then uses the above signals to determine (i) whether to perform recognition on the face detection and (ii) whether to commit to the determined identity and send out a notification to the registered user(s). For (i), predetermined thresholds for each of minimum face-embedding confidence, minimum landmarking confidence, and maximum face covering confidence determine whether to initiate an attempt of the identification on a face detection. Even if the detection passes these predetermined thresholds, the facial recognition module 446 may or may not commit to the determined identity. For (ii), the facial recognition module 446 infers the identity of a face detection by comparing (e.g., embedding comparison 714) the face embedding generated from that detection with the face embeddings of faces present in the local human library (in-memory local human library 466-1 in FIG. 6), which are pre-organized (e.g., grouped) into clusters (e.g., clusters 610) by the algorithm (and possibly corrected by the registered user). The task is to find the "best matching" cluster, if one exists, or create a new cluster (e.g., exemplar to be added to library 722) if this is the first time this face is being encountered.

At any point in the track (e.g., series of frames having a human face), the facial recognition module 446 can decide whether to commit to the identity inferred so far in the track or wait for a potentially "better" snapshot of the face to be obtained, which implies higher accuracy bounds. After committing to an identity, a notification is transmitted and the facial recognition module 446 is unable to change its decision. However, delaying the notification too much adds latency, possibly reducing the usefulness of that notification.

For detections with substantially high confidence values (e.g., 0.8, 0.85, 0.9, 0.95), the facial recognition module 446 commits to an identity immediately. In some cases, if the confidence value shows an "upward trend," meaning that the confidence value for successive frames increases with the passage of time, the facial recognition module 446 may choose to delay committing to the inferred identity. Responsive to committing to a particular identity, the device transmits either a familiar-person alert 718 or an unfamiliar-person alert 720.

For detections with lower confidence values (e.g., 0.55, 0.6, 0.7) but still passing some lower thresholds, the facial recognition module 446 infers the identity of the face but does not commit to the identity, based on a likelihood that a subsequent detection that passes the criteria in (i) is encountered. If no such detection is encountered by the end of the track (e.g., the object or person leaving the scene), the facial recognition module 446 collects the inferred identity for a plurality (including all) of qualifying face detections in the track and determines if a sufficient number (based on a threshold number) of the qualifying face detections are in "consensus" (e.g., the facial recognition module 446 inferred the same identity from them). If such a consensus exists, the facial recognition module 446 commits to the identity and an identity notification is sent. Responsive to committing to the identity, the device sends either a familiar-person alert 718 or an unfamiliar-person alert 720. If (i) and (ii) fail such that no identity decision could be reached, the camera does not send an additional alert containing identity information.

Figure 8:
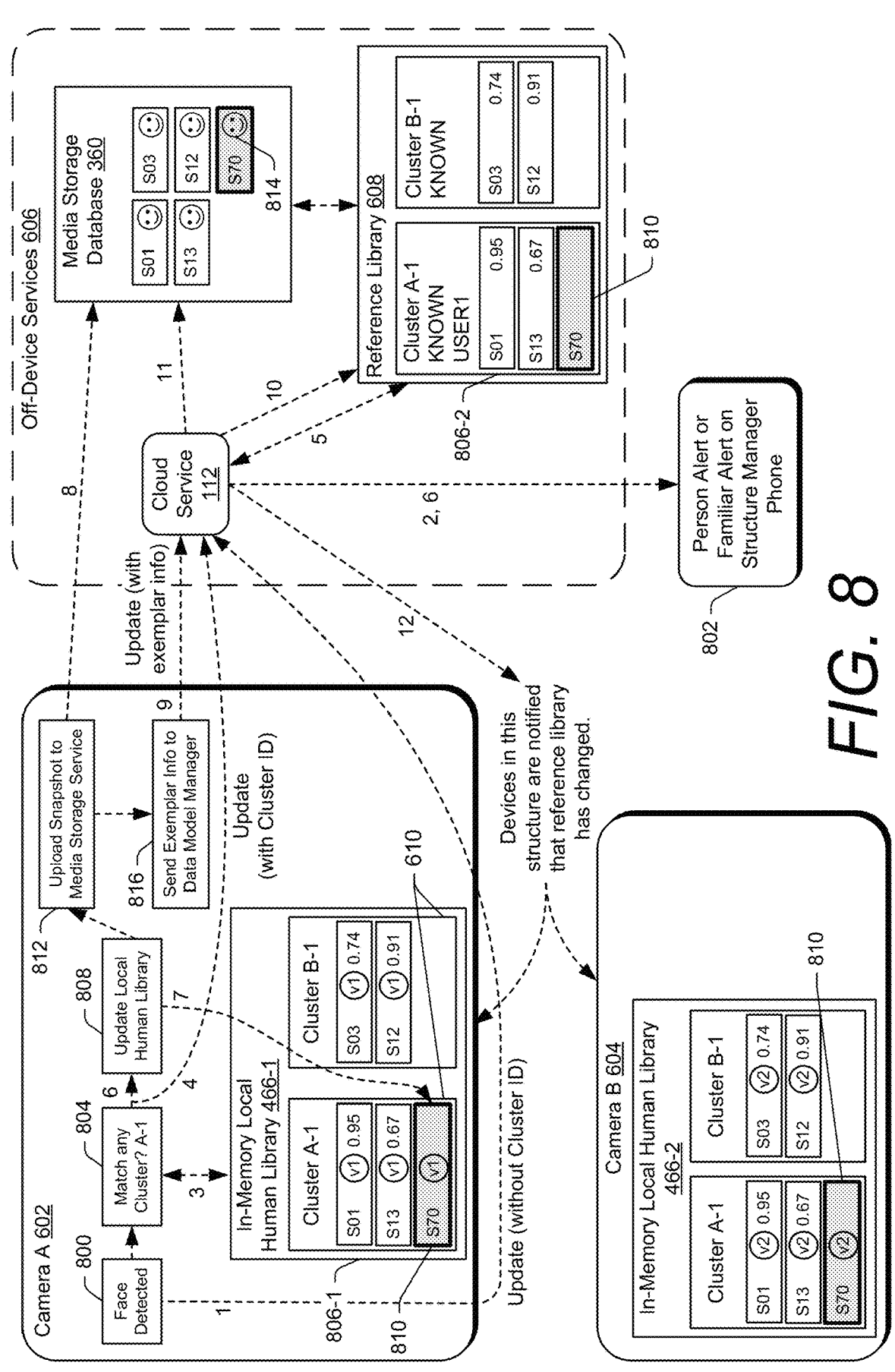
FIG. 8 illustrates an example implementation of the on-device facial recognition system of FIG. 6 according to a scenario in which a person is recognized as familiar.
Figure 9:
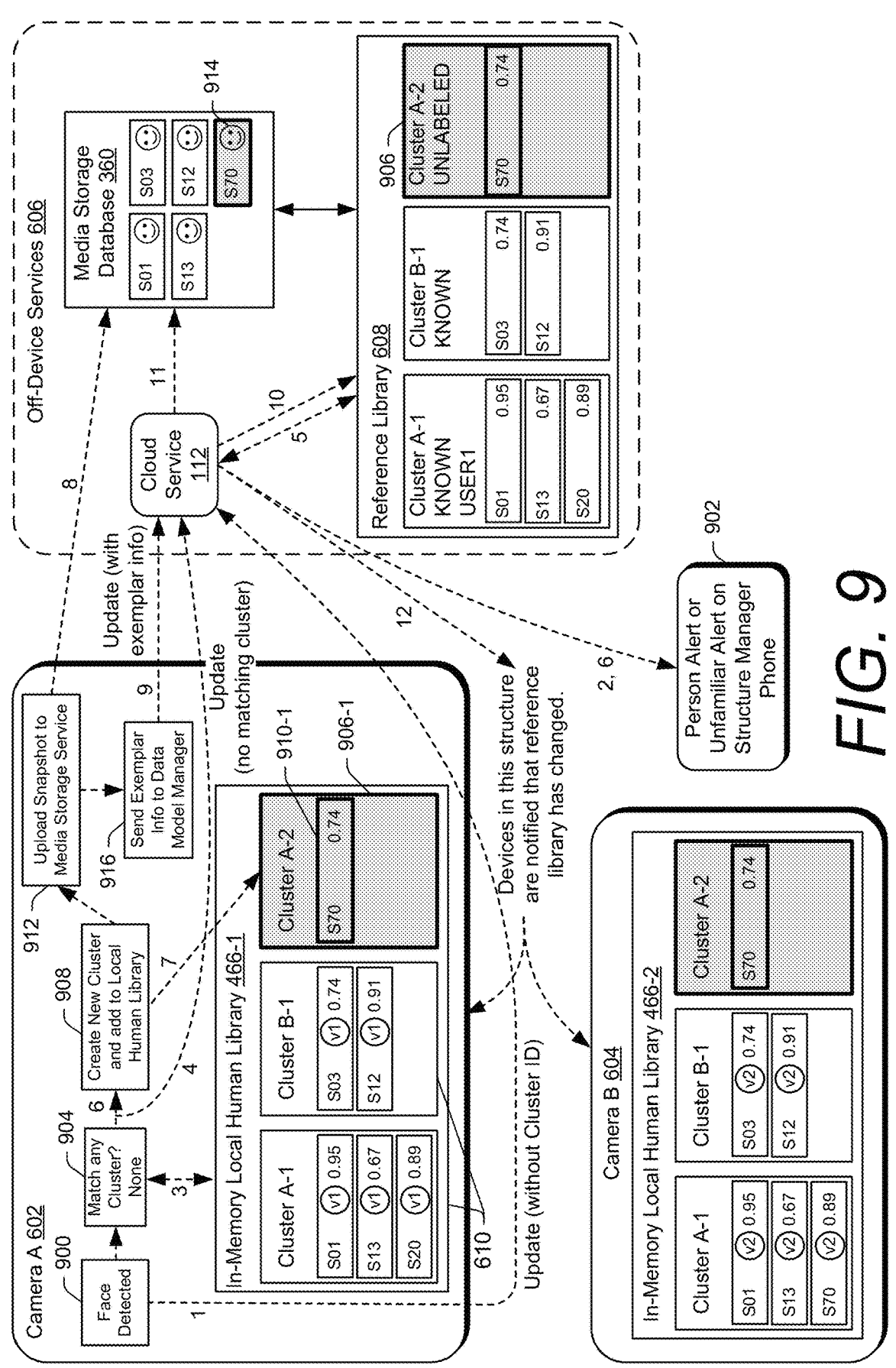
FIG. 9 illustrates an example implementation of the on-device facial recognition system of FIG. 6 according to a scenario in which a person is recognized as unfamiliar.
Figure 10:
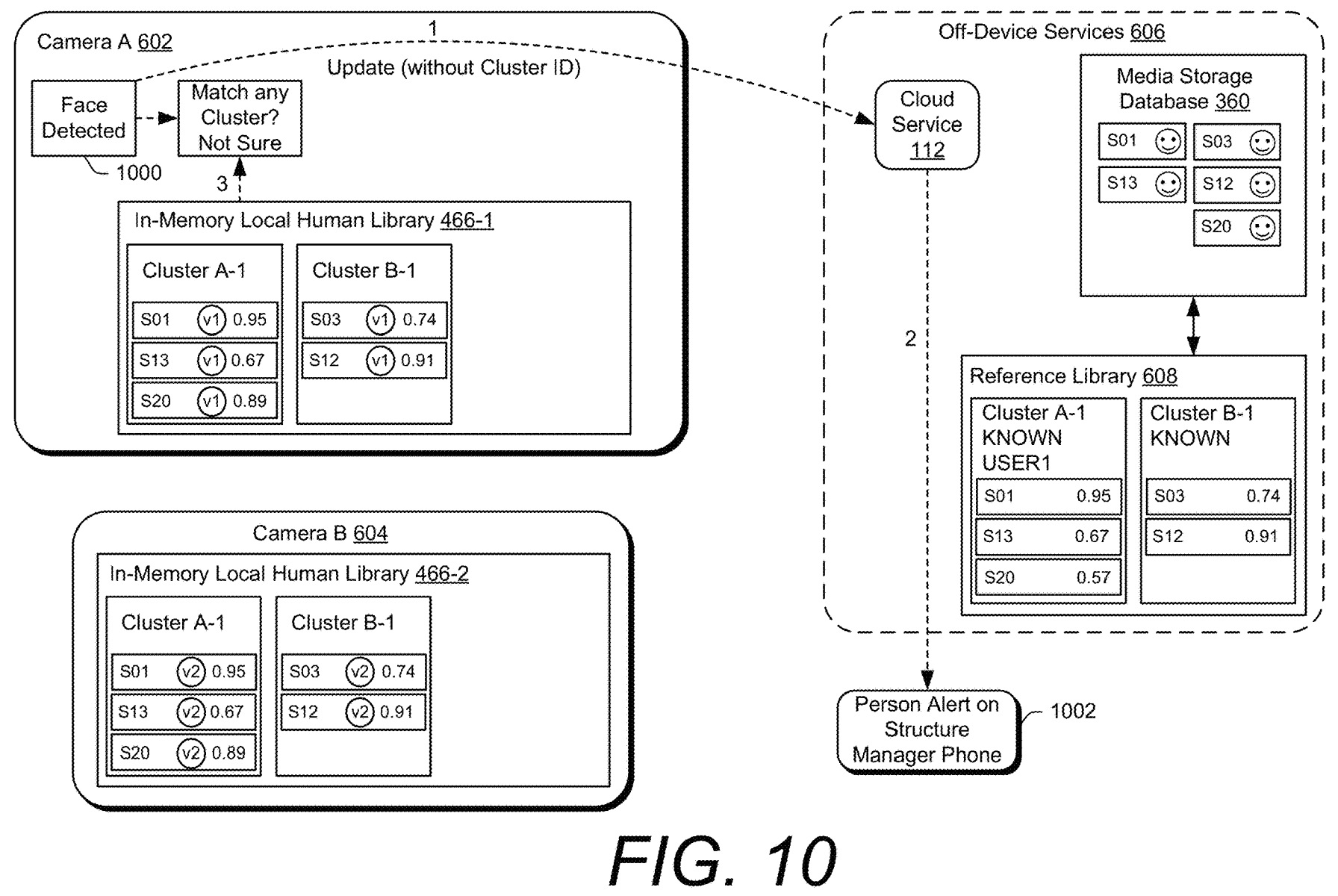

When the device detects a face, a variety of different scenarios may occur as a result. FIGS. 8, 9, and 10 illustrate different example scenarios. For example, FIG. 8 is directed to a familiar-person alert 718 scenario, FIG. 9 is directed to an unfamiliar-person alert 720 scenario, and FIG. 10 is directed to a scenario in which the device is uncertain whether to match the face to a cluster or reject it completely.

FIG. 8 illustrates an example implementation of the on-device facial recognition system of FIG. 6 according to a scenario in which a person is recognized as familiar. Continuing with the decentralized multi-device system having two cameras (e.g., camera A 602 and camera B 604) and one or more off-device services 606, the example illustrated in FIG. 8 indicates various operations being performed, some in parallel and some in sequence. In an example, camera A 602 detects a face 800 from an image. The camera A 602 sends (step 1) a first update with a session identifier (and without any cluster ID) to the cloud service 112 (at the beginning of the face track). In response, the cloud service 112 triggers an alert flow (e.g., for a person alert), which sends (step 2) an alert 802 to the structure manager. In one example, the cloud service 112 may send a notification to the user via an application on the user's smartphone. Meanwhile (step 3), the camera A 602 attempts to match, at 804, the detected face to one of the clusters 610 in its in-memory local human library 466 (e.g., in-memory local human library 466-1). In this example, camera A 602 identifies cluster A-1 806-1 to be a matching cluster to the detected face.

Upon locating a matching cluster, camera A 602 sends (step 4), a second update with the session identifier (session ID) and the cluster ID to the cloud service 112. Using the cluster ID, the cloud service 112 may locate (step 5) the matching cluster (e.g., cluster A-1 806-2) in the reference library 608. This second update enables the cloud service 112 to read the human category and name for the associated cluster ID from the reference library 608. Because the human category is "known," the cloud service 112 triggers (step 6) an alert flow (e.g., for a familiar face alert), which sends an alert (e.g., alert 802) with the human name.

Meanwhile, at 808, camera A 602 attempts to update the in-memory local human library 466-1. As illustrated at step 7, camera A 602 adds an exemplar (e.g., exemplar 810) to the relevant cluster (e.g., cluster A-1 806-1) in the in-memory human library (e.g., in-memory local human library 466-1) only. Then, at 812, camera A 602 uploads the snapshot to the off-device services 606. For example, camera A 602 uploads (step 8) the snapshot (e.g., snapshot 814) to the media storage database 360, using the snapshot ID as a UUID so the snapshot 814 can be subsequently retrieved. The upload may have a short time-to-live (TTL) (e.g., 3 hours, 5 hours, 8 hours, 12 hours) to automatically remove the snapshot 814 in case the rest of the process fails.

Upon successful upload of the snapshot 814, the camera A 602 sends (step 9) a third update to the cloud service 112 with the exemplar information for this event. For example, at 816, camera A 602 sends exemplar information corresponding to the added exemplar 612, along with the cluster ID, to the data model manager 326 at the cloud service 112. The cloud service 112 then updates (step 10) the reference library 608 in the data model manager 326. If updating the reference library 608 in the data model manager 326 succeeds, the cloud service 112 removes (step 11) the snapshot TTL in the media storage database 360 and notifies (step 12)

all the devices in the structure (e.g., both camera A 602 and camera B 604 in this example) that the reference library 608 has changed. Then, each device in the structure may update their local human library with the new exemplar (e.g., exemplar 810) and generate a face embedding using their own version of the facial recognition model.

FIG. 9 illustrates an example implementation of the on-device facial recognition system of FIG. 6 according to a scenario in which a person is recognized as unfamiliar. Continuing with the decentralized multi-device system having two cameras (e.g., camera A 602 and camera B 604) and one or more off-device services 606, the example illustrated in FIG. 9 indicates various operations being performed, some in parallel and some in sequence. In an example, camera A 602 detects a face 900 from an image. Similar to the process described in FIG. 8, the camera A 602 sends (step 1) a first update with a session ID (and without any cluster ID) to the cloud service 112 (at the beginning of the face track). In response, the cloud service 112 triggers a person-alert flow, which sends (step 2) an alert 902 to the structure manager. In an example, the cloud service 112 may send a notification to the user via an application on the user's smartphone.

Meanwhile (step 3), the camera A 602 attempts to match, at 904, the detected face to a cluster 610 in its local in-memory local human library 466-1. In this example, camera A 602 does not identify a matching cluster in its in-memory local human library 466-1 for the detected face. In response, camera A 602 sends (step 4) a second update with the session ID and a new cluster ID to the cloud service 112. Using the new cluster ID, the cloud service 112 cannot find a matching cluster in the reference library 608 (because the cluster does not exist), which means the detected face is an unfamiliar face. Consequently, the cloud service 112 creates (step 5) a new human in the reference library 608, marks the new human with the category "unlabeled," and creates a new cluster 906 (with that cluster ID) for the new human. The cloud service then sends (step 6) or triggers a transmission of an unfamiliar face alert (e.g., alert 902) to the structure manager's device.

Meanwhile, at 908, camera A 602 creates a new cluster associated with the new cluster ID and adds (step 7) the new cluster to the in-memory local human library 466-1. In this example, camera A 602 creates exemplar 910-1 and assigns the new cluster ID (e.g., "cluster A-2") to the new exemplar 910-1, thereby creating new cluster 906-1. Further, camera A 602 stores the new exemplar 910-1 with the assigned cluster ID in the in-memory local human library 466-1. Then, at 912, camera A 602 uploads the snapshot to the off-device services 606. For example, camera A 602 uploads (step 8) the snapshot (e.g., snapshot 914) to the media storage database 360, using the snapshot ID as a UUID so the snapshot (e.g., snapshot 914) can be subsequently retrieved. The upload may have a short TTL (e.g., 3 hours, 5 hours, 8 hours, 12 hours) to automatically remove the snapshot 914 in case the rest of the process fails.

Upon successful upload of the snapshot, the device sends (step 9) a third update to the cloud service 112 with the exemplar information for this event. For example, at 912, camera A 602 sends exemplar information corresponding to the added exemplar 612, along with the cluster ID, to the data model manager 326 at the cloud service 112. The cloud service 112 then updates (step 10) the reference library 608 in the data model manager 326. If updating the reference library 608 in data model manager 326 succeeds, the cloud service 112 removes (step 11) the snapshot TTL in the media storage database 360 and notifies (step 12) the devices (including all) in the structure (e.g., both camera A 602 and camera B 604 in this example) that the reference library 608 has changed. Then, each device in the structure may update its local human library 608 by creating a corresponding human and cluster with the new exemplar 612.

FIG. 10 illustrates an example implementation of the on-device facial recognition system of FIG. 6 according to a scenario in which the device is uncertain whether to match the face to a cluster or reject it completely. Similar to the examples described with respect to FIGS. 8 and 9, camera A 602 detects a face 1000 from an image and sends (step 1) an update with a session ID (and without any cluster ID) to the cloud service 112 (at the beginning of the face track). In response, the cloud service 112 triggers a person-alert flow, which sends (step 2) an alert 1002 to the structure manager. In an example, the cloud service 112 may send a notification to the user via an application on the user's smartphone.

Meanwhile, camera A 602 determines that the detected face has a low quality, or camera A 602 is uncertain about matching to any cluster in its in-memory human library (e.g., the face embedding has a low face embedding-confidence value). Consequently, no further update is sent to the cloud service 112 and thus, no changes are made to the reference library 608. Essentially, the process in this example ends at this point because camera A 602 cannot confidently match the detected face to a cluster and cannot confidently create a new cluster with a reliable exemplar.

In some implementations, a user interface is provided to the structure manager to enable the structure manager to manage or control certain aspects of the structure. For example, the structure manager can remove exemplars, remove a human (and their corresponding cluster), or merge humans (and their underlying clusters).

When the structure manager provides a user input via the user interface on their device (e.g., mobile device) to remove one or more exemplars, the cloud service 112 removes the exemplar(s) from the reference library 608 in the data model manager 326, removes the corresponding face snapshots from the media storage database 360, and notifies all devices in the structure that the reference library 608 has been changed. Each device in the structure can then download a copy of the reference library 608 and process the copy locally, as described above, to update their respective local human library.

When the structure manager provides a user input via the user interface on their device (e.g., mobile device) to remove one or more humans, the cloud service 112 removes information associated with the human (e.g., human ID, category, name) along with any associated exemplars from the reference library 608 in the data model manager 326, removes the corresponding face snapshots from the media storage database 360, and notifies all devices in the structure that the reference library 608 has been changed. Each device in the structure can then download a copy of the reference library 608 and process the copy locally, as described above, to update their respective local human library 608.

When the structure manager provides a user input via the user interface on their device (e.g., mobile device) to merge humans in the reference library 608, the cloud service updates the human ID of the affected clusters to a common human ID. No changes to the cluster ID or exemplars for each merged human are necessary. Also, no changes to the local human libraries 464 at the devices and in-memory local human libraries 466 at the devices are necessary. Thus, no notification to the devices in the structure is necessary when the user input causes humans in the reference library 608 to be merged.

Example Methods

FIGS. 11, 12, and 13 depict example methods 1100, 1200, and 1300, respectively, for on-device person recognition and provision of intelligent alerts. The methods 1100, 1200, and 1300 can be performed by the wireless network device 102. The method 1200 is supplemental to, and is optionally performed in conjunction with, the method 1100.

The methods 1100, 1200, and 1300 are shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example implementations, environments, entities, and/or processes as detailed in FIGS. 1-10, reference to which is made for example only. The techniques are not limited to performance by one entity or multiple entities operating on one device.

At 1102, a library of reference embeddings is stored in a local memory on a wireless network device having a camera, a facial recognition system, and an on-device machine-learning framework. For example, the camera A 602 (e.g., wireless network device 102, video camera 224, video-recording doorbell 226, smart device 204) stores the exemplars 612-1, organized into clusters 610, in the in-memory local human library 466-1. Also, the camera A 602 includes the camera module 452, the facial recognition system v1, and the machine-learning framework 442.

At 1104, a camera on the wireless network device captures an image of a person. For example, the camera module 452 of the smart device 204 captures an image of a person in the field of view of the image sensor 408.

At 1106, the wireless network device detects a face of the person in the image. For example, the face detection module 444 of the smart device 204 runs an ML model on the image to detect a human face in the image.

At 1108, the on-device machine-learning framework on the wireless network device generates a face embedding representing the face of the person in the image. For example, based on the results of the face detection, the facial recognition module 446 of the smart device 204 runs an ML model to generate a face embedding of the face in the image.

At 1110, the facial recognition system on the wireless network device verifies the face embedding against the clusters of reference embeddings stored in the local memory of the wireless network device. For example, the facial recognition module 446 on the smart device 204 searches the local human library 608 for a cluster 610 that matches the face embedding.

At 1112, the wireless network device transmits a result of the verifying to another device to notify a user of whether the face is a familiar face or an unfamiliar face. For example, the smart device 204 transmits a notification to another device (e.g., client device 228) of the user, via the cloud service 112, to notify the user whether the face is recognized as a familiar face (if an existing cluster in local memory matches the face embedding) or the face is not recognized and is therefore unfamiliar (if no existing cluster in local memory matches the face embedding).

Returning to 1106, the method may optionally proceed to 1202 in method 1200 of FIG. 12. FIG. 12 depicts a method 1200 that is optionally performed in conjunction with the method 1100 in FIG. 11 for filtering low-quality faces. At 1202, a face-embedding-confidence value is computed that measures a recognizability of the face detection. At 1204, based on a comparison of the face-embedding-confidence value to a threshold value, the wireless network device determines whether to perform a face embedding computation for the face detection.

At 1206, the wireless network device determines whether the face-embedding-confidence value is greater than (or less than) a threshold value. If the face-embedding-confidence value is greater than the threshold value ("YES" at 1206), then the method 1200 proceeds to 1108 in method 1100 of FIG. 11. If the face-embedding-confidence value is not greater than the threshold value ("NO" at 1206), then the face recognition process ends without generating any face embeddings and without attempting to identify the person in the image.

FIG. 13 depicts a method 1300 for on-device person recognition in a video stream in accordance with one or more implementations. At 1302, electronic device with a camera captures a video stream over a duration of time. For example, the camera module 452 of the smart device 204 captures a video stream over a period of time.

At 1304, the electronic device obtains a collection of face detections, one from each frame of the video stream, which tracks one object across space and time. For example, the face detection module 444 detects a face in each frame and tracks the face from one frame to the next to determine relative position and movement of the face in the video stream.

At 1306, the electronic device computes face-embedding-confidence values that measure a recognizability of the face detections. For example, the confidence module 448 uses the face detection as input to compute a face-embedding-confidence value for each face detection in the track.

At 1308, the electronic device determines that the face-embedding-confidence values are low based on a first threshold value. For example, the smart device 204 determines that the face-embedding-confidence values are below a first threshold value (e.g., 0.5, 0.55, 0.6, 0.65), which indicates that face embeddings generated based on these frames are likely to have low quality.

At 1310, the electronic device generates face embeddings for the face detections associated with face-embedding-confidence values that exceed a second threshold value. For example, the smart device 204 determines that the face-embedding-confidence values are above a second threshold value (e.g., 0.35, 0.4, 0.45, 0.49), which indicates that the likelihood of inferring a correct identity of the person in the video stream is at least moderate.

At 1312, the electronic device infers an identity for each face detection based on a comparison of each face embedding with clusters of face embeddings stored in a local memory of the electronic device. For example, the facial recognition module 446 computes a face embedding for each frame, uses the face embedding of each frame to locate a corresponding cluster in the local human library 608, and infers an identity for each face embedding. Inferring an identity means that the cluster identified as the best-match to the face embedding may only partially match the face embedding, which results in ambiguities and uncertainty.

At 1314, based on a determination that a sufficient number of the face detections are in consensus with one another on the inferred identity, the electronic device commits to the inferred identity and notifies a user of the electronic device. If the face detections produce face embeddings that best-match (e.g., 65%, 70%, 75%, 80%) to the same person, then it is highly likely that the inferred identity is the actual person in the face detections and the electronic device can commit to the inferred identity.

Some Examples are Described Below:

A method for on-device facial recognition, the method comprising: storing a library of reference embeddings in a local memory on a wireless network device having a camera, a facial recognition system, and an on-device machine-learning framework, the reference embeddings being grouped in clusters; capturing, by the camera on the wireless network device, an image of a person; detecting, by the wireless network device, a face of the person in the image to provide a face detection; generating, responsive to the detecting and by the on-device machine-learning framework on the wireless network device, a face embedding representing the face of the person in the image; verifying, by the facial recognition system on the wireless network device, the face embedding against the clusters stored in the local memory of the wireless network device; and transmitting a result of the verifying to another device to notify a user of whether the face is a familiar face or an unfamiliar face.

The method may further comprise, after detecting the face in the image and prior to generating the face embedding, transmitting a first update with a session identifier and without a cluster identifier to a cloud service to trigger an alert flow for notifying a device owner of the wireless network device of detection of a familiar face or an unfamiliar face by the wireless network device.

The method may further comprise: computing a face-embedding-confidence value that measures a recognizability of the face detection; and based on a comparison of the face-embedding-confidence value to a threshold value, determining whether to perform a face embedding computation for the face detection.

The clusters may include clusters of face embeddings; and the method may further comprise, responsive to the face-embedding-confidence value exceeding the threshold value: performing the face embedding computation to generate the face embedding of the face in the image; and performing facial recognition on the face detection by comparing the face embedding to the clusters of face embeddings stored in the local memory of the wireless network device.

The method may further comprise: identifying, from the clusters stored in the local memory, a matching cluster that matches the face embedding; inferring an identity of the face in the captured image based on the identity being associated with the matching cluster; and transmitting a notification to the other device to alert the user of the inferred identity of the face in the captured image.

The method may further comprise updating the local memory by adding the face embedding to the matching cluster for future facial recognition tasks.

The method may further comprise transmitting a second update with the session identifier and the cluster identifier to the cloud service to enable the cloud service to locate a corresponding matching cluster in a reference library associated with the cloud service.

The method may further comprise: uploading a snapshot of the detected face in the image to a media storage database associated with the cloud service, the snapshot being a cropped version of the image; and transmitting, to the cloud service, a third update with the session identifier and exemplar information corresponding to the face embedding added to the local memory of the wireless network device.

The method may further comprise, after uploading the snapshot to the media storage database, discarding a local copy of the snapshot and the image.

The method may further comprise: determining that the clusters of face embeddings stored in the local memory do not include a matching cluster that matches the face embedding; and transmitting a notification to the other device to alert the user that the face in the captured image is unfamiliar.

The notification may include a request for user input to identify the face in the captured image.

The method may further comprise, based the determining that the clusters of face embeddings do not include the matching cluster that matches the face embedding: creating a new cluster for the face embedding, the new cluster including a new cluster identifier; and adding the face embedding to the new cluster in the local memory.

The method may further comprise uploading a snapshot of the face detected in the image to a media storage database associated with the cloud service, the snapshot being a cropped version of the image; transmitting, to the cloud service, a third update with the session identifier and exemplar information corresponding to the face embedding added to the local memory of the wireless network device; and after uploading the snapshot to the media storage database, discarding a local copy of the snapshot and the image.

The facial recognition system may be is a local version of another facial recognition system used at the cloud service.

An electronic device comprising: a camera configured to capture images or video of a scene; one or more processors; and local memory storing: a local library of reference embeddings organized into clusters, each cluster having a subset of the reference embeddings and being associated with a human face; and executable instructions that, when executed by the one or more processors, cause the one or more processors to perform the above method.

CONCLUSION

Although aspects of on-device person recognition and provision of intelligent alerts have been described in language specific to features and/or methods, the subject of the appended claims is not necessarily limited to the specific features or methods described. Rather, the specific features and methods are disclosed as example implementations of the techniques for on-device person recognition and provision of intelligent alerts, and other equivalent features and methods are intended to be within the scope of the appended claims. Further, various different aspects are described, and it is to be appreciated that each described aspect can be implemented independently or in connection with one or more other described aspects.

What is claimed is:

1. A method for on-device facial recognition, the method comprising:

storing a library of clusters in a local memory on a wireless network device of a decentralized multi-device system, the wireless network device having a camera, a facial recognition system, and an on-device machine-learning framework, a respective cluster including one or more exemplars that are each associated with a same face, wherein at least one exemplar of the one or more exemplars in a respective cluster includes a reference embedding, an indication of a version of a facial recognition model used by the on-device machine-learning framework to generate the reference embedding, and a quality score of the at least one exemplar in relation to the facial recognition model;

capturing, by the camera on the wireless network device, an image of a person;

detecting, by the wireless network device, a face of the person in the image to provide a face detection;

generating, responsive to the detecting and by the on-device machine-learning framework on the wireless network device, a face embedding representing the face of the person in the image;

verifying, by the facial recognition system on the wireless network device, the face embedding against the clusters stored in the local memory of the wireless network device; and transmitting a result of the verifying to another device to notify a user of whether the face is a familiar face or an unfamiliar face.

2. The method of claim 1, further comprising, after detecting the face in the image and prior to generating the face embedding, transmitting a first update with a session identifier and without a cluster identifier to a cloud service to trigger an alert flow for notifying a device owner of the wireless network device of detection of a familiar face or an unfamiliar face by the wireless network device.

3. The method of claim 2, wherein:

the clusters include clusters of face embeddings; and the method further comprises:

computing a confidence value that measures a recognizability of the face detection;

based on a comparison of the confidence value to a threshold value, determining whether to perform a face embedding computation for the face detection; and responsive to the confidence value passing the threshold value, performing facial recognition on the face detection by comparing the face embedding to the clusters of face embeddings stored in the local memory of the wireless network device.

4. The method of claim 3, further comprising:

identifying, from the clusters stored in the local memory, a matching cluster that matches the face embedding;

inferring an identity of the face in the image based on the identity being associated with the matching cluster; and transmitting a first notification to the other device to alert the user of the inferred identity of the face in the image.

5. The method of claim 4, further comprising updating the local memory by adding the face embedding to the matching cluster for future facial recognition tasks.

6. The method of claim 4, further comprising transmitting a second update with the session identifier and the cluster identifier to the cloud service to enable the cloud service to locate a corresponding matching cluster in a reference library associated with the cloud service.

7. The method of claim 6, further comprising:

uploading a snapshot of the detected face in the image to a media storage database associated with the cloud service, the snapshot being a cropped version of the image; and transmitting, to the cloud service, a third update with the session identifier and exemplar information corresponding to the face embedding added to the local memory of the wireless network device.

8. The method of claim 7, further comprising, after uploading the snapshot to the media storage database, discarding a local copy of the snapshot and the image.

9. The method of claim 4, further comprising:

determining that the clusters of face embeddings stored in the local memory do not include a matching cluster that matches the face embedding; and transmitting a second notification to the other device to alert the user that the face in the image is unfamiliar.

10. The method of claim 9, wherein the second notification includes a request for user input to identify the face in the image.

11. The method of claim 9, further comprising, based the determining that the clusters of face embeddings do not include the matching cluster that matches the face embedding:

creating a new cluster for the face embedding, the new cluster including a new cluster identifier; and adding the face embedding to the new cluster in the local memory.

12. The method of claim 11, further comprising:

uploading a snapshot of the face detected in the image to a media storage database associated with the cloud service, the snapshot being a cropped version of the image;

transmitting, to the cloud service, a third update with the session identifier and exemplar information corresponding to the face embedding added to the local memory of the wireless network device; and after uploading the snapshot to the media storage database, discarding a local copy of the snapshot and the image.

13. The method of claim 2, wherein the facial recognition system is a local version of another facial recognition system used at the cloud service.

14. An electronic device comprising:

a camera configured to capture images or video of a scene;

one or more processors; and local memory storing:

a local library of reference embeddings organized into clusters, each cluster having one or more exemplars corresponding to a subset of the reference embeddings and being associated with a human face, at least one exemplar of the one or more exemplars in a respective cluster including a reference embedding, an indication of a version of a facial recognition model used to generate the reference embedding, and a quality score of the at least one exemplar in relation to the facial recognition model;

an on-device machine-learning framework configured to, based on a face detection of a face of a person in an image captured by the camera, generate a face embedding representing the face of the person in the image;

a facial recognition system configured to verify the face embedding against the clusters stored in the local memory, the facial recognition system including the facial recognition model used to generate the face embedding; and executable instructions that, when executed by the one or more processors, cause the one or more processors to:

transmit a result of a verification of the face embedding to another device to notify a user of whether the face is a familiar face or an unfamiliar face.

15. The electronic device of claim 14, wherein the instructions further cause the one or more processors to, based on the face detection and prior to generation of the face embedding, transmit a first update with a session identifier and without a cluster identifier to a cloud service to trigger an alert flow for notifying a device owner of the electronic device of detection of a familiar face or an unfamiliar face by the electronic device.

16. The electronic device of claim 15, wherein:

the clusters include clusters of face embeddings; and the instructions further cause the one or more processors to:

compute a confidence value that measures a recognizability of the face detection;

based on a comparison of the confidence value to a threshold value, determine whether to perform a face embedding computation for the face detection; and responsive to the confidence value passing the threshold value:

perform, based on the comparison of the confidence value to the threshold value, facial recognition on the face detection by comparing the face embedding to the clusters of face embeddings stored in the local memory;

identify, from the clusters stored in the local memory, a matching cluster that matches the face embedding;

infer an identity of the face in the captured image based on the identity being associated with the matching cluster; and transmit a first notification to the other device to alert the user of the inferred identity of the face in the captured image.

17. The electronic device of claim 14, wherein the instructions further cause the one or more processors to:

determine that the clusters of face embeddings stored in the local memory do not include a matching cluster that matches the face embedding; and transmit a second notification to the other device to alert the user that the face in the captured image is unfamiliar.

18. The electronic device of claim 17, wherein the instructions further cause the one or more processors to, based a determination that the clusters of face embeddings do not include the matching cluster that matches the face embedding:

create a new cluster for the face embedding, the new cluster including a new cluster identifier; and add the face embedding to the new cluster in the local memory.

19. The electronic device of claim 16, wherein the recognizability of the face detection measured by the confidence value indicates whether a face embedding subsequently generated from the face detection is more likely or less likely to be similar to embeddings of other face detections of the same person and different from embeddings of face detections of other people.

20. The electronic device of claim 16, wherein the confidence value is based on an estimation of an L2-Norm of the face embedding.

* * * * *